United States Patent
Li

(10) Patent No.: US 9,369,218 B1
(45) Date of Patent: Jun. 14, 2016

(54) SYSTEM FOR COMMUNICATIONS LINK COMPONENTS

(71) Applicant: Altera Corporation, San Jose, CA (US)

(72) Inventor: Peng Li, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 259 days.

(21) Appl. No.: 14/094,571

(22) Filed: Dec. 2, 2013

Related U.S. Application Data

(62) Division of application No. 12/250,465, filed on Oct. 13, 2008, now Pat. No. 8,615,201.

(51) Int. Cl.
*H04B 17/00* (2015.01)

(52) U.S. Cl.
CPC ................... *H04B 17/0097* (2013.01)

(58) Field of Classification Search
CPC .................................... H04B 17/3912
USPC ....................................... 455/67.11
See application file for complete search history.

(56) References Cited

U.S. PATENT DOCUMENTS

| | | | |
|---|---|---|---|
| 6,980,824 B2 | 12/2005 | Hsu et al. | |
| 7,046,640 B2 | 5/2006 | Silva et al. | |
| 7,133,654 B2 | 11/2006 | Carballo et al. | |
| 7,450,948 B2 | 11/2008 | Argyropoulos et al. | |
| 7,668,132 B2 | 2/2010 | Kwak et al. | |
| 2005/0152488 A1 | 7/2005 | Buckwalter et al. | |
| 2005/0226156 A1* | 10/2005 | Keating | H04L 69/28 370/235 |

OTHER PUBLICATIONS

Li, Mike Peng. "Jitter, Noise, and Signal Integrity at High Speed." Prentice Hall, 2007. p. 276-278.
National Committee for Information Standardization (NCITS). "Fiber Channel." Working draft. Nov. 22, 2005.
Tao, U.S. Appl. No. 11/524,012, filed Sep. 19, 2006.

* cited by examiner

*Primary Examiner* — Eugene Yun
(74) *Attorney, Agent, or Firm* — Treyz Law Group; Jason Tsai; Vineet Dixit

(57) ABSTRACT

Design systems are provided to assist users in designing circuits that include communications links. A communications link may include a transmitter link subsystem, a receiver link subsystem, and a channel subsystem that interconnects the transmitter and receiver subsystems. A user may specify global link performance characteristics such as bit error rate and data rate. Measured link subsystem performance characteristics may be gathered and stored in a database as probability distribution functions. When analyzing a link, known link subsystems parameters supplied by the user may be used to retrieve appropriate link subsystem performance data. The retrieved link subsystem data and the global link performance data may be analyzed and used to produce recommended subsystem limits. A logic design system may use information on a user's logic design and the recommended limits in producing programmable logic device configuration data.

20 Claims, 14 Drawing Sheets

| TX TYPE | TOTAL JITTER (ps) |
|---------|-------------------|
| TYPE 1  | 20                |
| TYPE 2  | 25                |
| TYPE 3  | 30                |
| TYPE 4  | 22                |
| ⋮       |                   |

FIG. 10

SYSTEM FOR COMMUNICATIONS LINK COMPONENTS

This application is a division of patent application Ser. No. 12/250,465, filed Oct. 13, 2008, which is hereby incorporated by reference herein in its entirety.

BACKGROUND

This invention relates to communications, and more particularly, to systems for assisting users in selecting and designing components for communications systems. Communications links in communications systems include transceiver circuits and channel media. A communications link may be considered to be made up of three link subsystems: a transmitter (TX), a channel (CH), and a receiver (RX). The transmitter is used to transmit data onto the channel from circuitry at the transmitter. The channel conveys the transmitted data to the receiver. The receiver accepts the transmitted data from the channel and provides the received data to circuitry at the receiver.

When used in a system, link subsystems may introduce signal impairments such as jitter and noise. These impairments have deterministic and random components. For example, jitter may include random jitter (RJ) and deterministic jitter (DJ) components. Random jitter may be characterized by unbounded probability distribution functions such as a Gaussian function. Deterministic jitter, which can arise from sources such as intersymbol interference (ISI), duty cycle distortion (DCD), periodic jitter (PJ), and cross talk, may be characterized by a bounded probability distribution function.

When designing a given communications link, a system designer may attempt to optimize each subsystem to meet a set of link performance criteria. For example, a system designer may select transmitter, channel, and receiver components with low noise and jitter characteristics when attempting to design a high-speed link with a stringent bit error rate (BER) limit. Many high-speed link standards specify minimum acceptable performance criteria for signals at the transmitter output and at the receiver input. The system designer may ensure compliance with a desired link standard and therefore acceptable link performance by selecting components with the ability to meet these minimum criteria.

While this type of design methodology may be satisfactory in certain situations, it can be difficult or impossible to identify workarounds when a particular link subsystem does not pass a compliance test associated with a particular high-speed link standard. In general, if a particular link subsystem is not able to meet the necessary performance benchmarks for that subsystem, there is no way to readily determine whether it might be possible to overcome this shortcoming by improving the performance of other link subsystems. As a result, if a system designer has locked down part of a design, the designer may be unable to identify a complete set of acceptable link subsystems that could be used to complete the design.

For example, a link standard might specify a particular noise and jitter level at a transmitter output and at a receiver input for a link. The receiver circuit may be fixed, due to considerations such as part availability or customer preference. If the receiver circuit is not compliant with the receiver performance criteria set forth in the link standard, conventional wisdom might dictate that the link should fail. This overlooks the possibility that improvements to the transmitter subsystem might be made that could compensate for the deficiencies of the receiver and thereby allow the link to be operated satisfactorily.

Another challenge arises when link subsystems exceed required minimum performance specifications. For example, both a transmitter and a receiver may perform better than the minimum acceptable level required by a link standard. In this situation, there is no established mechanism for providing a system designer with design assistance to take advantage of the extra performance margin available in the link.

Some link systems are designed around programmable logic device integrated circuits. In systems such as these, a logic designer would like to know how to select an optimum device family and how to best implement a desired custom logic design in that device family while satisfying link performance criteria.

It would therefore be desirable to be able to provide improved design assistance for designers of communications links and link subsystems.

SUMMARY

In accordance with the present invention, design systems are provided to assist users in designing circuits that include communications links. A communications link may include a transmitter link subsystem, a receiver link subsystem, and a channel subsystem that interconnects the transmitter and receiver subsystems. During the design process, a user of a design system may desire to identify an appropriate circuit design for a link subsystem based on the known operating characteristics of other subsystems in the link.

A link analysis engine associated with the design system may use convolution-based operations to determine recommended link subsystem characteristics based on known characteristics for other subsystems. For example, the link analysis engine may compute recommended transmitter operating characteristics based on known channel and receiver characteristics.

A user of the design system may specify global link performance characteristics such as bit error rate, data rate, and operating data pattern. Measured link subsystem performance characteristics may be gathered and stored in a database using probability distribution functions. When analyzing a link, known link subsystems parameters supplied by the user may be used to retrieve appropriate link subsystem performance data from the database. The retrieved link subsystem data and the global link performance data may be analyzed by the link analysis engine and used to produce recommended subsystem limits.

Recommendations may be provided in the form of displayed or printed output. One or more discrete limit values may be produced or more extensive limit functions may be produced such as limits in the form of probability distribution functions for jitter, noise, or other signal impairments. Recommendations may be stored in a database.

A logic design system may use information on user's logic design and the recommended limits that have been stored in the database of recommendations in producing programmable logic device configuration data for a field-programmable gate array.

Further features of the invention, its nature and various advantages will be more apparent from the accompanying drawings and the following detailed description of the preferred embodiments.

BRIEF DESCRIPTION OF THE DRAWINGS

FIG. 10 is an illustrative table that may be used by a design system in determining which families of programmable logic device may be implemented to implement a desired user design for a particular communications link in accordance with an embodiment of the present invention.

DETAILED DESCRIPTION

The present invention relates to communications. In particular, the invention relates to design systems that analyze the performance of communications links. The results of the analysis may be presented to a designer or other user of a design system. The results of the analysis may also be used as an input to logic design equipment that is used in designing integrated circuits. The integrated circuits that are designed in this way may be any suitable integrated circuits that include communications capabilities, such as memory chips, digital signal processing circuits, microprocessors, application specific integrated circuits, programmable logic device integrated circuits, field-programmable gate arrays, application specified standard products, or any other suitable integrated circuit. Embodiments of the present invention may sometimes be described in the context of designing high-speed communications links that include one or more link subsystems that are implemented on programmable integrated circuits. This is, however, merely illustrative. Any suitable communications links and set of communications link subsystems may be designed using design systems in accordance with the present invention if desired.

Design systems in accordance with embodiments of the present invention may be used in connection with any suitable system that contains communications links. Systems in which the links carry high-speed digital signals are typically among the most challenging to design. It may therefore be particularly desirable to use the design systems when implementing a design in an environment with one or more a high-speed links. A typical high-speed link might, as an example, carry data at several gigabits per second.

Figure 1:
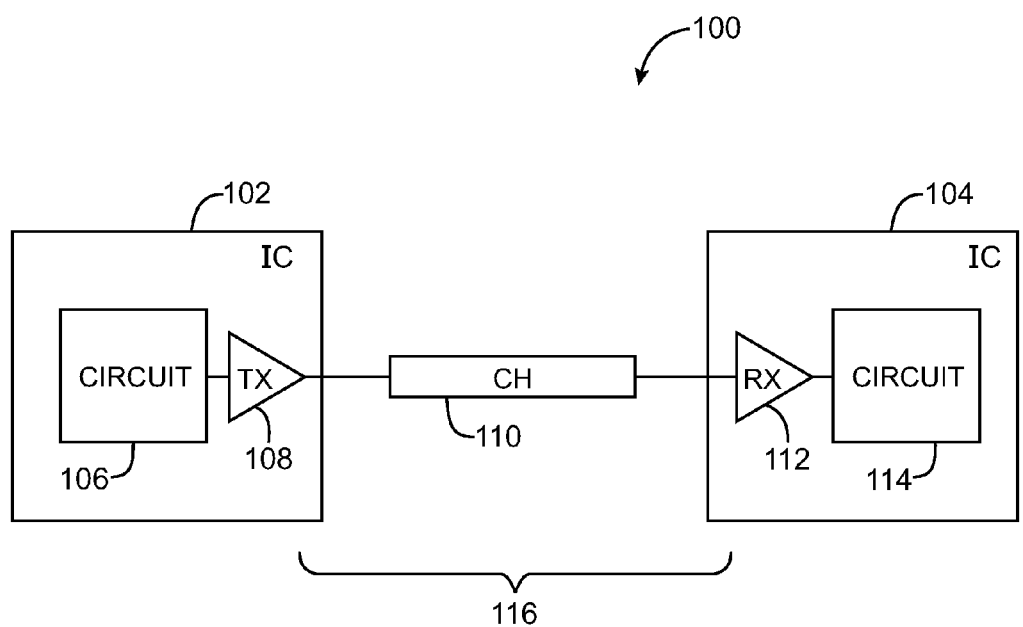
FIG. 1 is a diagram of an illustrative system in which link subsystems and link performance may be analyzed for a system designer in accordance with an embodiment of the present invention.

An illustrative system for which design tools in accordance with an embodiment of the present invention may be used to provide design assistance is shown in FIG. 1. As shown in FIG. 1, system 100 may include components such as integrated circuits 102 and 104. Integrated circuits 102 and 104 may be, for example, memory circuits, digital signal processors, microprocessors, application specific integrated circuits, programmable integrated circuits such as programmable logic devices or other integrated circuits that contain programmable elements, or any other suitable integrated circuits. Circuits 102 and 104 may be different types of integrated circuits. For example, circuit 102 may be a programmable logic device and circuit 104 may be an application-specific integrated circuit.

Circuits 102 and 104 may contain circuitry such as circuit 106 and 114. Circuits 106 and 114 may be, for example, digital logic circuits. Circuit 106 may produce data that is to be transmitted from integrated circuit 102 to integrated circuit 104 over link 116. Circuit 114 may consume data that has been received at the receiving end of link 116.

Transmitter 108 may be used to transmit data from circuit 106 to receiver 112 over channel 110. Transmitter 108 may, for example, be implemented as part of integrated circuit 102. Receiver 112 may, as an example, be implemented as part of integrated circuit 104. Channel 110 may be formed from any suitable physical transmission medium. Examples of transmission paths that may be used in channel 110 include differential signaling paths made up of pairs of conductive wires, single conductive paths, coaxial cable paths and other transmission-line paths, paths on printed circuit boards, combinations of such paths, or other suitable communications link paths. In a typical system, integrated circuits 102 and 104 may be mounted on one or more circuit boards and channel 110 may involve transmission line structures fabricated on the circuit board or boards. A common clock may be used to clock both circuit 102 and circuit 104, or circuit 104 may extract an appropriate clock signal from the data stream that is transmitted over channel 110 (as examples).

In the example of FIG. 1, integrated circuit 102 contains a single transmitter 108 and integrated circuit 104 contains a single corresponding receiver 112. A single channel 110 is used to connect transmitter 108 to receiver 112. This is merely illustrative. If desired, integrated circuit 102 may contain multiple transmitters such as transmitter 108 and integrated circuit 104 may contain multiple corresponding receivers such as receiver 112. Multiple communications paths may be used to link the transmitters and receivers. Integrated circuit 102 may also include one or more receivers that receive data from one or more corresponding transmitters on integrated circuit 104. Data may also be conveyed to and from additional integrated circuits using transmitters and receivers such a transmitter 108 and receiver 112.

In designing links such as link 116, a user generally should take into account the properties of each portion of the link. Transmitter 108, channel 110, and receiver 112 are sometimes referred to as link subsystems. Each link subsystem in link 116 may be characterized by a set of performance characteristics. For example, each link subsystem may be characterized by a set of associated signal impairments such as signal noise and signal jitter. These properties affect link performance. In a typical scenario, overall performance constraints may be imposed on link 116. For example, the application for which link 116 is designed may require that link 116 exhibit no more than a maximum bit error rate (BER). The required bit error rate for link 116 might be $10^{-12}$. In designing link 116, the link subsystems are preferably configured so that the performance constraints for link 116 are satisfied. This may involve configuring link subsystems so that they exhibit no more than a particular amount of noise and no more than a particular amount of jitter. Compliant link subsystems may, in general, be implemented by selecting an appropriate off-the-shelf part or by custom designing a hard-wired application-specific integrated circuit or a programmable logic circuit.

Because there are multiple link subsystems in link 116, the process of choosing appropriate link subsystems may be complex. There are generally non-trivial interactions between the properties of each link subsystem. If overly-simplified methods of link performance analysis are used, the resulting system design might perform satisfactorily, but may represent a sub-optimal solution. This is because use of simplistic design techniques may lead to overly-conservative designs in which link subsystems with excessive performance levels are recommended. In systems of this type, parts tend to be more complex and expensive than they need to be, leading to an inefficient allocation of resources.

With arrangements in accordance with the present invention, a design system can make accurate recommendations that allow more optimal designs to be constructed. Accuracy may be enhanced, as an example, by using actual measurements of link subsystem performance for one or more of the link subsystems.

Figure 2:
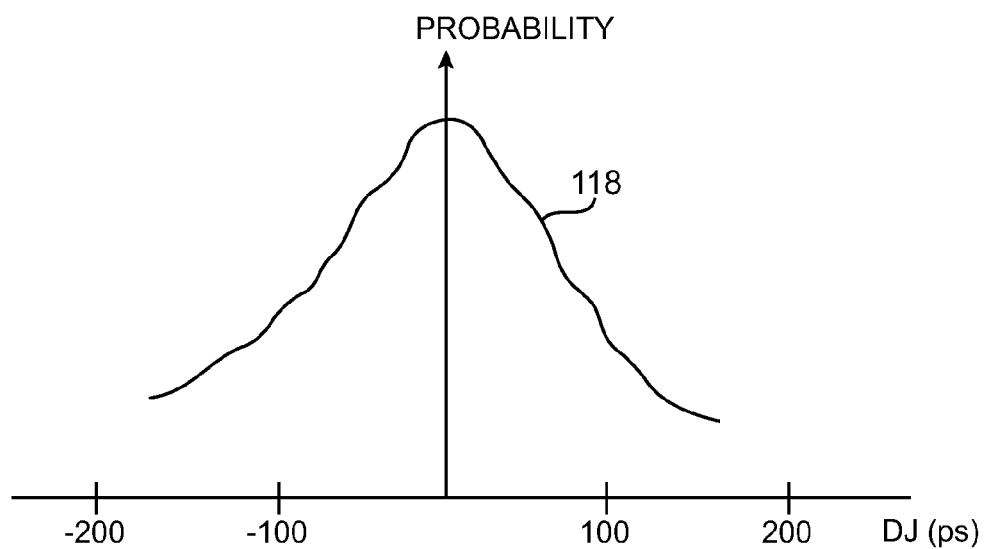
FIG. 2 is an illustrative probability distribution function associated with deterministic jitter measurements made on a link subsystem in accordance with an embodiment of the present invention.

In general, any suitable technique may be used in characterizing a link subsystem. For example, based on model results, a receiver with a particular circuit layout can be estimated to exhibit a certain amount of total jitter. Model results tend not to be as accurate as actual measured results due to the complexities and nonlinearities associated with integrated circuits, so it may be advantageous in this type of situation to make measurements of the receiver's total jitter. Jitter measurements and jitter model results may be represented as one or more values such as estimated or measured values of total jitter (TJ), deterministic jitter (DJ), and random jitter (RJ), or using probability distribution functions. An illustrative probability distribution function for a link subsystem is shown in FIG. 2. In the example of FIG. 2, the jitter data that is being plotted is deterministic jitter data (as an example). As shown in FIG. 2, function 118 may contain a central peak, indicating that the link subsystem is mostly characterized by low jitter values (e.g., values less than about 100 ps). Lower probability distribution function values at higher jitter values (e.g., above 200 ps in magnitude) indicate that large jitter values are encountered less frequently.

Probability distribution functions, which are also sometimes referred to as histograms or probability density functions, may represent a more accurate way in which to characterize a link subsystem than using a single discrete value or a relatively small number of discrete values. Accordingly, accuracy in the design process may be improved by using probability distribution functions when available. Measured data also tends to be significantly more accurate than modeled data in many instances, so accuracy in the design process may also be improved by using measured data when appropriate. Although the signal impairment that is plotted in the illustrative probability distribution function of FIG. 2 is a deterministic jitter probability distribution function, any suitable signal impairment value (e.g., noise, random jitter, total jitter, etc.) may be represented as a probability distribution function if desired.

When a variety of parts are available for use in a link such as link 116, these parts may be characterized by measured signal impairment data such as the jitter probability distribution function of FIG. 2. Measured data characterizing available link subsystems may be stored using any suitable technique. With one illustrative arrangement, each different type of link subsystem may be measured (e.g., to produce a corresponding jitter probability distribution function or at least a measured jitter value) and the measured link subsystem characterizing data may be stored in a database. When optimizing link 116, a user of the design system may supply input that informs the design system of known parameters. The design system may retrieve known measured data characterizing appropriate link subsystems. This retrieved measured data may then be used in performing simulations and assisting the user in the design process. As an example, if a user informs the design system that a channel and a receiver with particular jitter performance characteristics are to be used, the design system may recommend that the transmitter in link 116 meet certain design criteria (e.g., by meeting minimum recommended jitter values).

The design system can produce recommendations for any suitable link subsystems. For example, the design system may be used to evaluate a what-if scenario in which the performance of the transmitter and the channel are known and in which the minimum performance characteristics of the receiver are not known. Based on the results of the link analysis performed by the design system, the user may select an appropriate receiver. As another example, the performance of the channel and the receiver may be known and the recommended performance levels for the transmitter may not be known. This type of what-if scenario may be analyzed to determine appropriate transmitters to use in the link.

In some situations, the user may be satisfied with recommendations that allow the user to select an appropriate off-the-shelf link subsystem. For example, the user may select an integrated circuit to use in system 100 based on the requirement that the transmitters on that circuit have a particular maximum total jitter value. In other situations, the link subsystem selection process may be intertwined with the process of implementing a custom logic design in a programmable integrated circuit. In situations of this type, the recommendations that the design system produces from analyzing the link may, in turn, be used to inform a programmable logic device design system of system requirements. The logic design tools may use the recommendations to identify which types of transmitter are acceptable for use when implementing the user's custom logic design in an integrated circuit. A programmable logic device family and an appropriate transmitter type that is available in that family may then be used.

Figure 3:
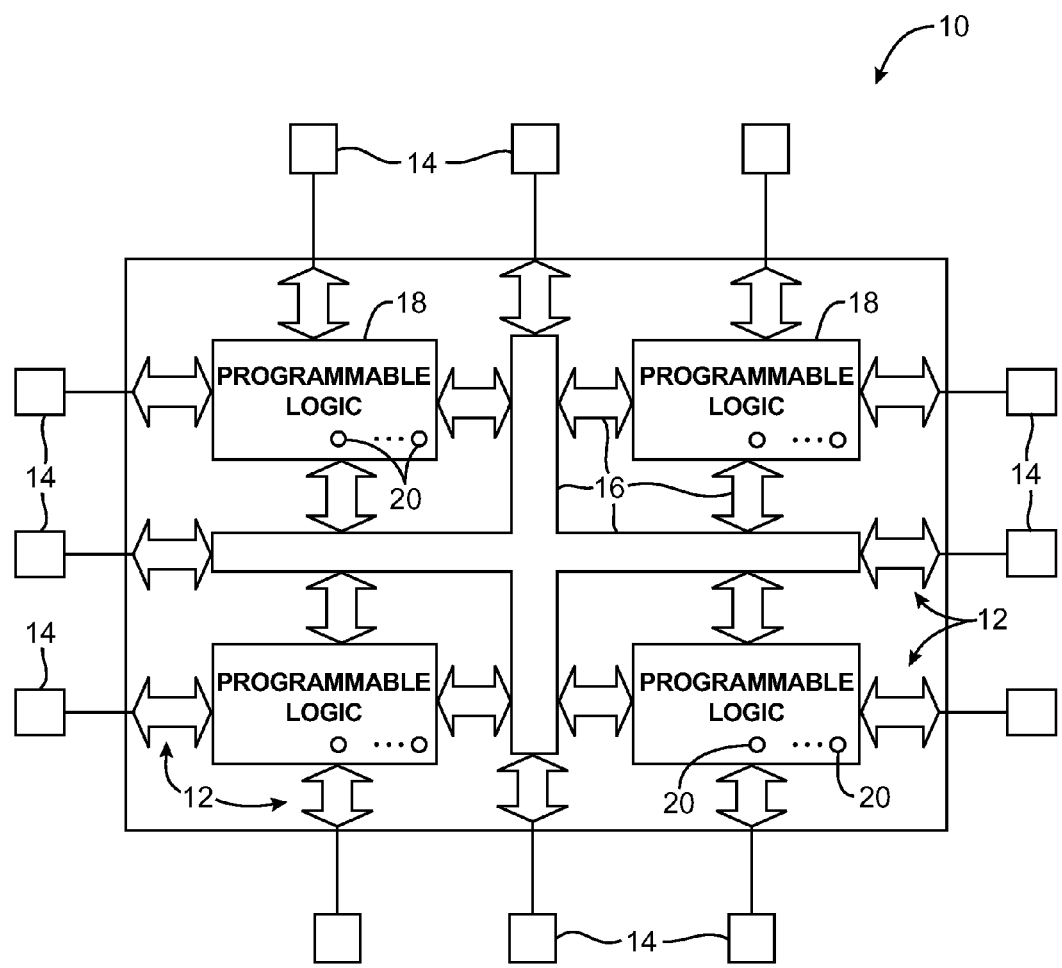
FIG. 3 is a diagram of an illustrative programmable integrated circuit that may be designed with assistance from a design system in accordance with an embodiment of the present invention.

An illustrative programmable integrated circuit such as a programmable logic device integrated circuit that may be selected and used to implement a user's logic design based on link subsystem recommendations from a design system is shown in FIG. 3. Programmable integrated circuit 10 may have input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function. The programmable interconnects associated with interconnection resources may be considered to be a part of programmable logic 18.

Programmable device 10 contains memory elements 20. The memory elements may be implemented using any suitable memory technology (e.g., random-access-memory cells, registers, other volatile memory cells, non-volatile cells, mask-programmed elements, etc.). Memory elements 20 can be provided with configuration data. In a typical arrangement, memory elements 20 are formed from memory element structures that can be loaded with configuration data (also called programming data) using pins 14 and input/output circuitry 12. Once loaded, the memory elements each provide a corresponding static control output signal that controls the state of an associated logic component in programmable logic 18. The memory element output signals are typically applied to the gates of metal-oxide-semiconductor (MOS) transistors. These transistors may include n-channel metal-oxide-semiconductor (NMOS) pass transistors in programmable components such as multiplexers and logic array blocks (LABs) and may include p-channel metal-oxide-semiconductor (PMOS) transistors.

When a memory element supplies a high output to an NMOS pass transistor, the transistor is turned on and passes logic signals from its input to its output. When the memory element output is low, the pass transistor is turned off and does not pass logic signals. PMOS transistors are turned on by low control signals and are turned off by high control signals. Being able to configure transistors in this way allows logic in the programmable logic device to be programmed to implement a desired custom logic design.

A typical memory element 20 is formed from a number of transistors configured to form cross-coupled inverters. With one suitable approach, complementary metal-oxide-semiconductor (CMOS) integrated circuit technology is used to form the memory elements 20. In the context of programmable logic device integrated circuits, the memory elements store configuration data and are typically random-access-memory (RAM) elements. As a result, these programmable logic device memory elements are sometimes referred to as configuration random-access-memory (CRAM) cells. Other terms that are sometimes used to refer to memory elements 20 include terms such as memory cells, static random-access-memory elements or cells, RAM cells, RAM elements, CRAM cells, configuration elements, configuration bits, etc. In a typical modern programmable logic device, there may be thousands or millions of memory elements 20 on each chip. Programmable integrated circuits with other number of memory elements may also be used.

The circuitry of device 10 may be organized using any suitable architecture. As an example, the logic of device 10 may be organized in a series of rows and columns of larger programmable logic regions each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Still other device arrangements may use logic that is not arranged in rows and columns.

Figure 4:
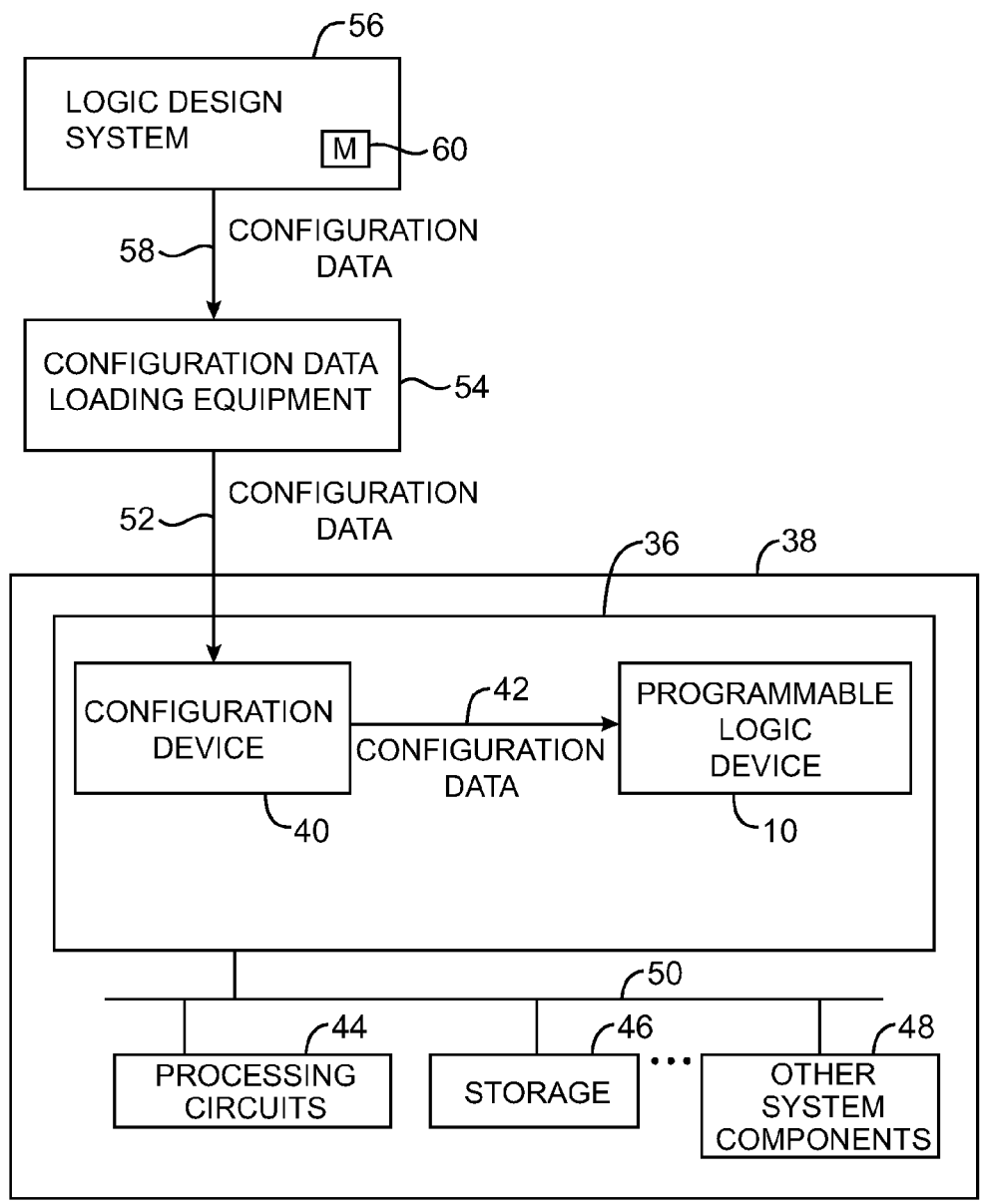
FIG. 4 is a system diagram showing how a logic design system may be used to generate configuration data that is loaded into a programmable integrated circuit to configure logic in the programmable integrated circuit in accordance with a user's logic design in accordance with an embodiment of the present invention.

An illustrative system environment for a programmable device 10 is shown in FIG. 4. Programmable device 10 may be mounted on a board 36 in a system 38. In general, programmable device 10 may receive programming data from programming equipment or from any other suitable equipment or device. In the example of FIG. 4, programmable device 10 is the type of programmable device that receives configuration data from an associated integrated circuit 40. With this type of arrangement, circuit 40 may, if desired, be mounted on the same board 36 as programmable logic device 10. The circuit 40 may be an erasable-programmable read-only memory (EPROM) chip, a programmable logic device configuration data loading chip with built-in memory (sometimes referred to as a configuration device), or any other suitable device. When system 38 boots up (or at another suitable time), the configuration data for configuring the programmable logic device may be supplied to the programmable device from device 40, as shown schematically by path 42. The configuration data that is supplied to the programmable device may be stored in the programmable device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses and other electrical paths 50. Components such as these may communicate using communications links such as communications link 116 of FIG. 1.

Configuration device 40 may be supplied with the configuration data for device 10 over a path such as path 52. Configuration device 40 may, for example, receive the configuration data from configuration data loading equipment 54 or other suitable equipment that stores this data in configuration device 40.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 4, the configuration data produced by a logic design system 56 may be provided to equipment 54 over a path such as path 58. The equipment 54 provides the configuration data to device 40, so that device 40 can later provide this configuration data to the programmable logic device 10 over path 42.

Logic circuit design system 56 includes processing circuitry and storage 60. In supporting design operations involved in implementing a user's desired custom logic function, the logic design system 56 uses software implemented on circuitry and storage 60 to make circuit resource assignments and placement decisions.

Figure 5:
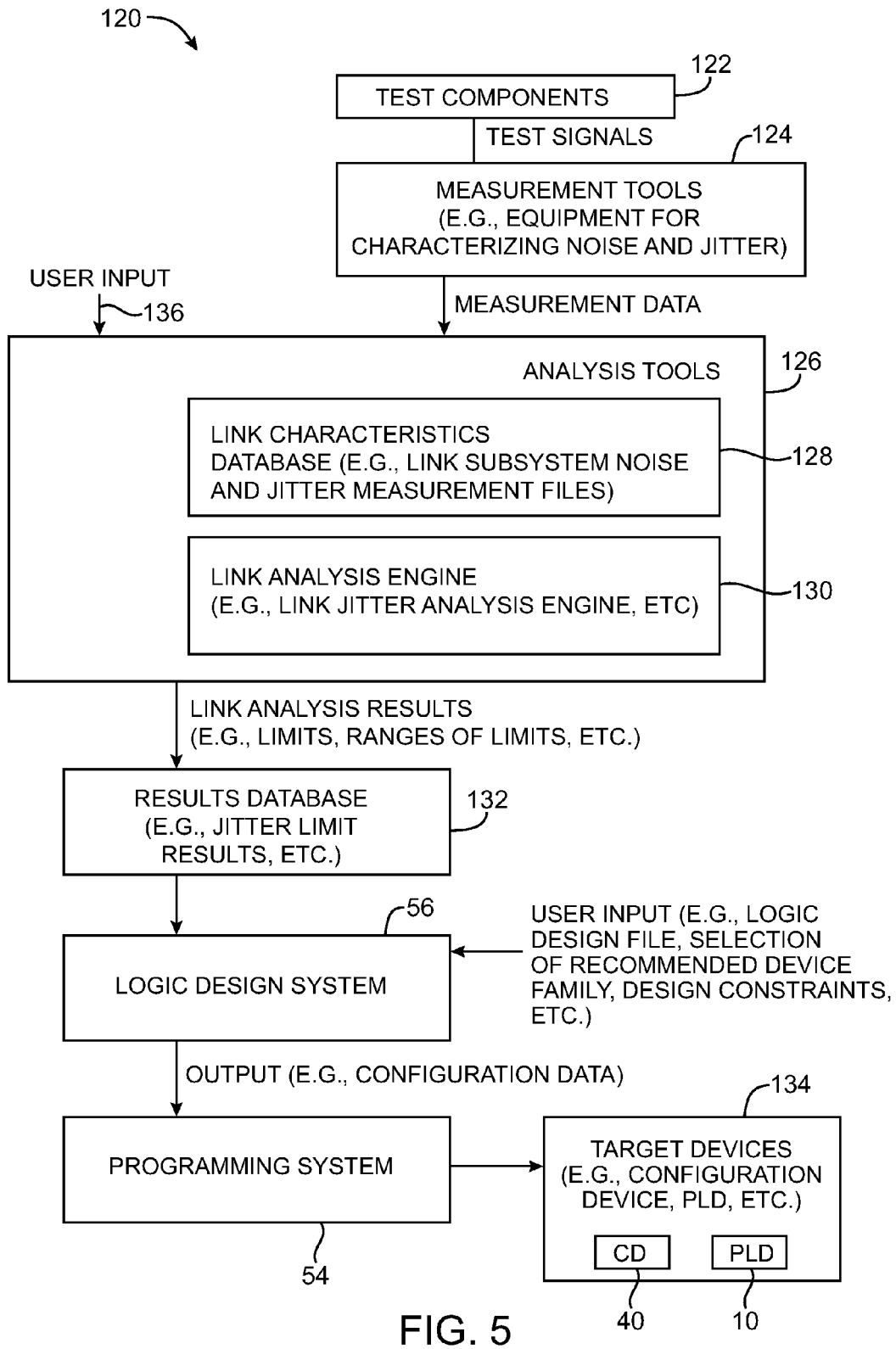
FIG. 5 is a diagram of a system that may be used to analyze communications link performance and to produce optional configuration data for a programmable integrated circuit in accordance with an embodiment of the present invention.

Computer aided design tools such as tools associated with system 56 may, if desired, be used as part of a larger design system of the type shown in FIG. 5. As shown in FIG. 5, design system 120 may include analysis tools 126. Analysis tools 126 may perform link analysis operations using data on link subsystem characteristics and link performance requirements. Based on this analysis, analysis tools 126 can generate recommendations such as proposed jitter limits, noise parameters, etc. These analysis results, in turn, may be used by logic design system 56 to design a custom integrated circuit or to produce configuration data that implements a user's custom logic design. The configuration data may then be loaded into target devices 134 such as configuration devices 40 and programmable logic devices 10. The computer-aided tools of system 120 may be implemented using software running on one or more computers, networked computers, or any other suitable computing equipment.

A typical communications link analysis that is performed by tools 126 is based on the characteristics of certain link subsystems. For example, a link analysis may be performed to determine optimal transmitter requirements based on known signal impairment characteristics of a channel link subsystem and receiver link subsystem. The known signal impairment characteristics may be, for example, known jitter levels for the channel and receiver. Overall link performance criteria such as required bit error rate criteria may also be used by tools 126 when analyzing link 116.

Data on performance criteria and link subsystem characteristics may be provided to analysis tools 126 using any suitable arrangement. In some situations, it may be desirable to supply the information via an on-screen data entry box displayed for the user by tools 126 or other suitable user interface mechanisms. Tools 126 may, for example, provide a user with an on-screen option that allow the user of system 120 to enter a known jitter level associated with channel 110 in link 116. User-supplied signal impairment data such as this may be used in evaluating link performance. Models such as circuit performance models may be used by tools 126 to predict how particular link subsystems will perform in link 116. In some circumstances, however, models may be inaccurate. Models (e.g., circuit based models) may also be time-consuming to execute and may consume large amounts of system resources.

Another approach for gathering data for analysis tools 126 involves making characterizing measurements on potential link components. As shown in FIG. 5, the performance of various components 122 may be tested using measurement tools 124. For example, the jitter of a receiver may be measured. Components 122 may include link subsystems such as circuits that include transmitters, channels, and receivers. Components 122 may include, for example, a series of programmable logic device integrated circuits, each of which has a different type of output driver (transmitter). Multiple types of transmitters that are located on a given integrated circuit may also be tested. Receivers of various types may be tested. Each receiver may be formed as part of a different integrated circuit or different types of receivers may be located on a common integrated circuit.

Measurement tools 124 may include any suitable characterizing equipment for testing link subsystems, such as oscilloscopes, bit error rate testers (BERTs), vector network analyzer (VNA) equipment, meters, computer-based test stations, automated test equipment (ATE), combinations of devices of these types, or any other suitable equipment. Measurements may be made that correspond to different settings of the measured devices (e.g., different transmitter output voltage settings, different receiver gain settings, etc.). A user of design system 120 or a third party (e.g., a device's manufacturer) may make device measurements.

Measurements that may be made include measurements of signal impairments such as jitter and noise measurements. Different types of jitter and noise may be measured. For example, total jitter may be measured, and/or measurements may be made of various contributions to total jitter, such as random jitter and sources of deterministic jitter (e.g., intersymbol interference, duty cycle distortion, periodic jitter, and cross-talk).

Measurement data may be stored using any suitable format. For example, one or more discrete characterizing measurements (e.g., total jitter) may be stored using tables or other suitable data structures. More complex data may also be measured and stored. For example, sufficiently detailed measurements may be made that allow signal impairments to be represented in the form of probability distribution functions. Probability distribution function data may include tens, hundreds, or thousands of data points for each measured characteristic. For example, a jitter probability distribution function may be collected that contains hundreds or thousands of measured jitter values corresponding to a given link subsystem. Measurement data that is gathered when characterizing link subsystem performance may be stored in a database such as link characteristics database 128.

Analysis tools 126 may include a link analysis engine 130. Analysis engine 130 may be used to implement network analysis functions for tools 126. Analysis engine 130 may ask the user of system 120 for input 136. Some of the input may be used by engine 130 directly. For example, the user may instruct engine 130 that a channel in a link has a particular value of total jitter. This particular jitter value (which may, if desired, be stored in a database such as database 128), may be used during the analysis operations performed by engine 130. Other user inputs may be used to identify which previously measured data should be retrieved from database 128. For example, a user may specify that receiver 112 in link 116 has a total jitter value of 150 ps (as an example). This value may be used to retrieve measurements from database 128 that match this restriction (e.g., one or more receiver probability distribution functions that match this jitter characteristic). The retrieved jitter data may be presented in the form of a jitter probability distribution function.

Analysis engine 130 can solve both underdetermined and over-determined problems. The results that are output in underdetermined scenarios can be provided as a range of recommended alternatives (e.g., in tables, tradeoff curves, etc.). Simplifying assumptions may be used where appropriate. For example, in systems in which the transmitter, channel, and receiver can be taken to operate independently, a convolution-based analysis approach may be used. With this type of arrangement, analysis engine 130 uses analysis functions that are based on convolution operations (convolution and deconvolution). Probability distribution functions can be simplified when appropriate. For example, a probability distribution function for a signal impairment such as signal jitter may be represented using a dual-Dirac distribution (e.g., a distribution having a probability value associated with a first of two jitter values and a second probability associated with a second of two jitter values). When probability distribution functions are represented using the dual-Dirac method, analytically-based analysis operations may be simplified.

If desired, analysis engine 130 can produce results for multi-link systems. In a typical multi-link scenario, multiple links are involved in linking integrated circuits. These links may be connected in parallel and/or in series. Each sublink in a communications link may be characterized by a separate set of user-specified global performance characteristics, a separate set of receiver jitter probability function data, etc. When a simulation is performed by engine 130 for a multi-link system, simulation results may be produced for each system sublink. For example, recommended maximum jitter limits may be computed for each transmitter when there is more than one transmitter in the system each of which is associated with a separate parallel sublink.

As shown in FIG. 5, the output from link analysis engine 130 may be stored in one or more suitable storage locations such as results database 132. Results database 132 may be implemented on the same equipment as tools 126, may be implemented on a different platform, or combinations of these approaches may be used. A typical recommendation might be that a transmitter in link 116 should have a particular jitter performance by, for example, exhibiting a jitter below a recommended maximum jitter value. The user of design system 120 can follow this recommendation or may reformulate the what-if scenario that is being analyzed by tools 126 (e.g., by increasing or decreasing the values of characteristics associated with the known link subsystems).

Output data from database 132 may be printed for a user (e.g., using printing equipment in system 120), may be displayed on a computer monitor in system 120, or may be used as an input to additional processing tools. As an example, the recommendations produced by link analysis engine 130 can be used to help a user design a custom integrated circuit for a link subsystem that satisfies the recommendations. This process may be automated. For example, a computer-aided design tool that is used for designing custom integrated circuits may use recommendations in selecting which circuits are appropriate to incorporate into a design. If the computer-aided design tool is being used to design a custom integrated circuit containing a transmitter circuit, for example, the custom-circuit computer-aided design tool may size the transistors and other circuits in the transmitter circuitry based on the recommended jitter performance level (e.g., by locating an acceptable preexisting transmitter design in a design library based on the recommendations in database 132).

Recommendations from results database 132 may also be used by a programmable logic device design system such as logic design system 56 (e.g., system 56 of FIG. 4). System 56 may receive user input on a desired logic design. The user input may be supplied in the form of user selections of on-screen options and by user-supplied data in design files. System 56 may automatically determine which types of communications link subsystems will be able to satisfy the recommendations from results database 132 while implementing the user's custom logic design. For example, if a transmitter of a particular maximum jitter value is desired, system 56 can automatically determine which programmable logic device families contain acceptable transmitter resources. A user may be provided with an opportunity to select a programmable logic device family from among these matches. Logic design system 56 may then perform optimization and place and route operations to implement the user's customer logic design in the selected programmable logic device family and may produce corresponding configuration data as an output.

As shown in FIG. 5, the configuration data may be loaded into target devices 134 (e.g., configuration devices 40 and/or programmable logic devices 10) using programming system 54.

Consider, as an example, a situation in which a user of design system 120 has already selected a desired channel and receiver for use in link 116. The type of channel that is being used in link 116 may be selected based on required compliance with overall system specifications. For example, it may be necessary to use a differential circuit board path for the channel, because the user is designing a system that must be implemented on printed circuit boards. The receiver may be fixed by external requirements (e.g., use of a preselected vendor's parts, etc.). In this type of scenario, the user knows which channel and receiver are to be used, but would like assistance in selecting and designing an appropriate transmitter.

Figure 6:
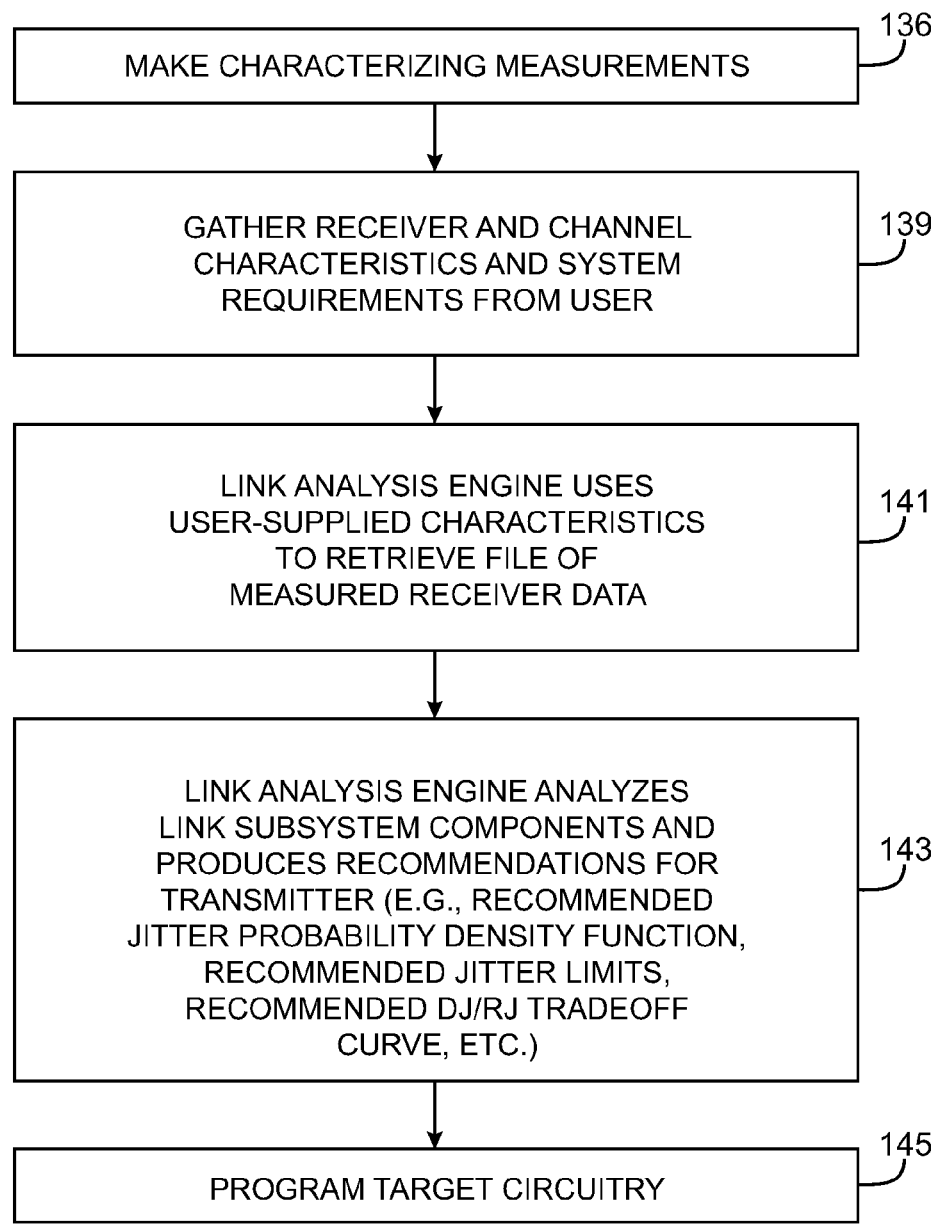
FIG. 6 is a flow chart of illustrative steps involved in using the characteristics of known link subsystems such as a channel link subsystem and a receiver link subsystem to produce recommendations for implementing another link subsystem such as a transmitter link subsystem in accordance with an embodiment of the present invention.

Illustrative steps involved in using system 120 in this type of scenario are shown in FIG. 6.

At step 136, measurements may be made on link subsystems such as the channel and receiver subsystems. These measurements may result in characteristics such as measured values of signal impairments (noise, jitter) and may be represented as discrete values or probability distribution functions. Characterizing measurements may be made on suitable test components 122 using measurement tools 124 (FIG. 5) and may be stored in database 128. The measurements of step 136 may be made at any suitable time by any suitable party. As an example, some of the measurements may be made in advance by the user or by a vendor of the characterized link subsystem components.

At step 139, design system 120 may be used to gather receiver and channel characteristics. For example, the user may be provided with on-screen options on a computer monitor. The on-screen options may be used by the user to supply desired characteristics for the channel and receiver. The user may, for example, be provided with an opportunity to enter a total jitter value associated with the channel. The user may also be provided with an opportunity to enter one or more characteristics for the receiver in link 116. As an example, system 120 may display a text box into which the user may enter a total jitter value associated with the receiver. System 120 may also gather information from the user on link performance criteria such as a maximum acceptable bit error rate for link 116.

The channel data supplied by the user (e.g., a maximum allowable jitter value) may be acceptable for use by engine 130 in performing link analysis operations. Other link subsystems (e.g., the receiver) may benefit from the user of more detailed measurement data. Link analysis engine 130 may therefore use the information that has been supplied by the user to retrieve more detailed measured data from database 128. For example, engine 130 may retrieve a probability distribution function corresponding to the required receiver based on the user's specified receiver jitter value. There may be, for example, numerous jitter probability distribution functions associated with receivers of different types. During step 141, matching measurement data such as a jitter probability distribution function associated with a receiver having the desired user-specified jitter value, may be retrieved for use by engine 130.

At step 143, link analysis engine 130 may analyze link 116 based on the known link subsystem data (e.g., the user-supplied channel characteristic and the retrieved measured jitter probability distribution function data associated with the receiver). Based on this link subsystem data, link analysis engine 130 may produce appropriate recommendations for the transmitter in the link. For example, engine 130 may recommend that the transmitter exhibit no more than a particular maximum total jitter value.

At step 145, a logic design system such as system 56 and programming system 54 may be used to implement a user's custom logic while satisfying the recommendations produced by link analysis engine 130. System 56 may generate configuration data for a target device 134 and may load the configuration data to implement the custom logic.

Figure 7:
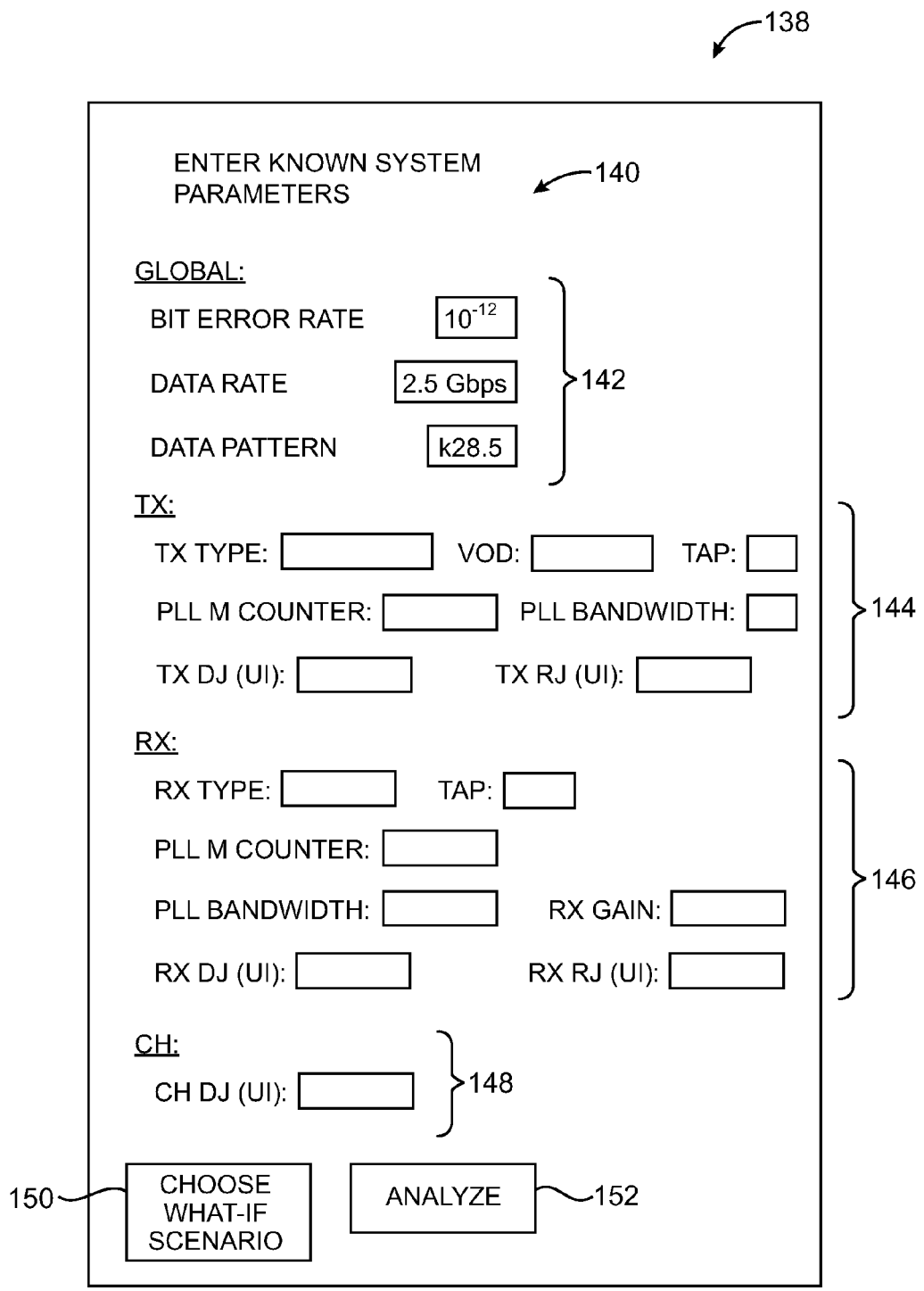
FIG. 7 is an illustrative input screen that may be presented to provide a user with an opportunity to input an analysis problem into a design system in accordance with an embodiment of the present invention.

An illustrative input screen 138 that may be provided to a system designer or other user by design system 120 of FIG. 5 is shown in FIG. 7. Screen 138 may be displayed on a computer monitor or other input device by link analysis engine 130 (analysis tool 126). As shown in FIG. 7, screens such as screen 138 may include instructions 140 that direct a user to enter known link subsystem parameters. The user may supply known characteristics for any of the link subsystems (e.g., the transmitter and the channel, the transmitter and the receiver, the channel and the receiver, partial information about one, two, or three link subsystems, etc.).

Global link performance requirements may be supplied in global input region 142. Region 142 may include fillable text boxes or other input regions that allow a user to supply required performance metrics for link 116. In the example of FIG. 7, the user has specified that link 116 must exhibit a bit error rate of less than $10^{-12}$ and must support a data rate of 2.5 Gbps when stressed using a data pattern such as the well-known K28.5 pattern.

Transmitter characteristics input region 144 may be provided to allow a user to specify required performance characteristics for the transmitter (if desired). The user may use region 144 to enter information on a desired transmitter type. If, for example, the user knows that a transmitter with a particular design must be used in link 116, the user may inform tool 126 of this transmitter type. The transmitter type may be specified using a transmitter name, using the name of an integrated circuit in which the transmitter is included, or using any other suitable identification technique. The peak-to-peak output voltage VOD that is produced at the output of the transmitter and information on signal preemphasis tap coefficient (TAP) settings for equalization may also be supplied. Phase-locked loops are commonly used in transmitter and receiver circuits to handle clock signals (e.g., in clock generator circuits and clock and data recovery circuits). The PLL M counter setting in the transmitter circuit represents an integer value for the divider in the phase-locked loop's feedback path. The magnitude of the PLL M counter settings reflects a tradeoff that may be made between transmitter frequency, bandwidth, and lock time. If desired, options 144 may be used to specify whether the phase-locked loop has a low, medium, or high bandwidth design. Jitter characteristics such as deterministic jitter (DJ) and random jitter (RJ) may also be entered in region 144 (e.g., in unit intervals). If desired, other options may be provided to allow the user to enter transmitter characteristics. The transmitter characteristics illustrated by the options of region 144 of FIG. 7 are merely illustrative.

Receiver characteristics input region 146 may be used to specify receiver performance characteristics. The user may, for example, enter a receiver type in the RX type box and may enter equalization (pulse emphasis) settings in the TAP box. PLL M counter and PLL bandwidth characteristics for the receiver may also be entered using region 146. Options 146 may be used to enter receiver signal impairment characteristics such as receiver deterministic jitter (DJ) and receiver random jitter (RJ).

Region 148 may be used to specify performance characteristics for channel 110 such as channel deterministic jitter (DJ). If desired, other channel characteristics may be specified (i.e., other required characteristics such as jitter-related characteristics), etc.

Using this approach, engine 130 may receive receiver and transmitter characteristics such as phase-locked loop characteristics, clock recovery characteristics (e.g., a phase-locked loop setting in a clock-and-data recovery circuit or other clock recovery circuit setting), and equalization characteristics (e.g., pulse emphasis settings). These are merely illustrative examples. Any suitable characteristics may be specified if desired.

When a user has finished specifying which characteristics in the link subsystems are known, the user may, if desired, click on option 150 to choose a what-if scenario. As an example, the user may select a what-if scenario entitled "known RX, known CH, calculate TX." Choosing this analysis scenario will inform link analysis engine 130 that the characteristics in regions 146 and 148 are to be considered known and engine 130 should therefore calculate transmitter recommendations (e.g., characteristics such as the characteristics listed in region 144). If desired, link analysis tools 126 can automatically surmise which type of what-if scenario is applicable by determining which fields in regions 144, 146, and 148 have been left empty. When the user is ready to initiate the link analysis process, the user may click on analyze option 152.

Figure 8:
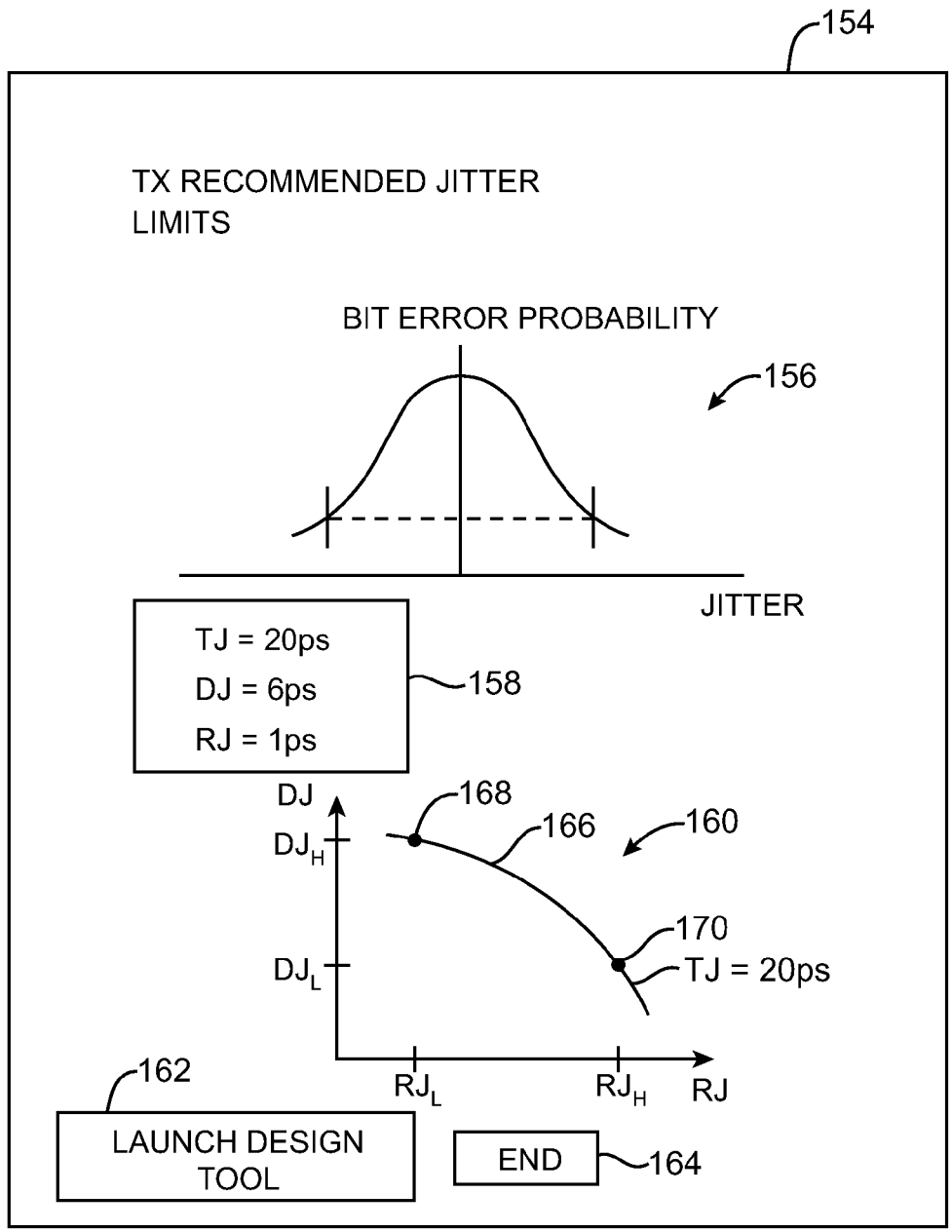
FIG. 8 is an illustrative output screen that may be presented to provide a user with design recommendations in accordance with an embodiment of the present invention.

FIG. 8 shows an illustrative screen 154 that may be used to present the results of the analysis performed by engine 130 to the user. In general, any suitable results may be provided (e.g., recommended performance criteria for one or more subsystems such as recommended BER values, jitter margin recommendations, etc.).

As shown in FIG. 8, screen 154 may contain graphs such as graph 156. Graph 156 may be, for example a graph of a signal impairment probability distribution function such as a total jitter probability distribution function. This function may represent a recommended maximum amount of jitter that the transmitter should exhibit when meeting the global link performance criteria entered in region 142 (FIG. 7) based on the known receiver and channel characteristics.

Screen 154 may also contain tables of recommendations such as table 158. Table 158 contains a recommended maximum total jitter (TJ) value, a recommended deterministic jitter (DJ) limit, and a recommended value for the maximum permitted random jitter (RJ).

Tradeoff graphs such as graph 160 may also be presented in screen 154. In the example of FIG. 7, graph 160 corresponds to a particular total jitter value (20 ps). Points along the solid line 166 represent possible allocations of total jitter among its deterministic jitter (DJ) and random jitter (RJ) components. Any of the points on line 166 represents a satisfactory solution. A user could, for example, select a transmitter for link 116 that is characterized by point 168. In this scenario, the transmitter could have a deterministic jitter component of up to $DJ_H$ and could have a random jitter component of up to $RJ_H$. Alternatively, the user could select a transmitter for link 116 that meets the jitter requirements specified by point 170. In this situation, the transmitter could have up to $DJ_L$ in deterministic jitter and up to $RJ_H$ in random jitter.

The user may use the link subsystem design recommendations that tools 126 present with screens such as screen 154 to manually select an appropriate transmitter for link 116. If the user intends to use these results manually, the user may print a copy of screen 154 and click on the end option 164. If, however, the user wishes to design a custom circuit or desires to implement a particular user design in a programmable logic circuit based on this recommendation, the user may click on launch design tool option 162 to run the programmable logic device computer aided design tools of logic design system 56.

Figure 9:
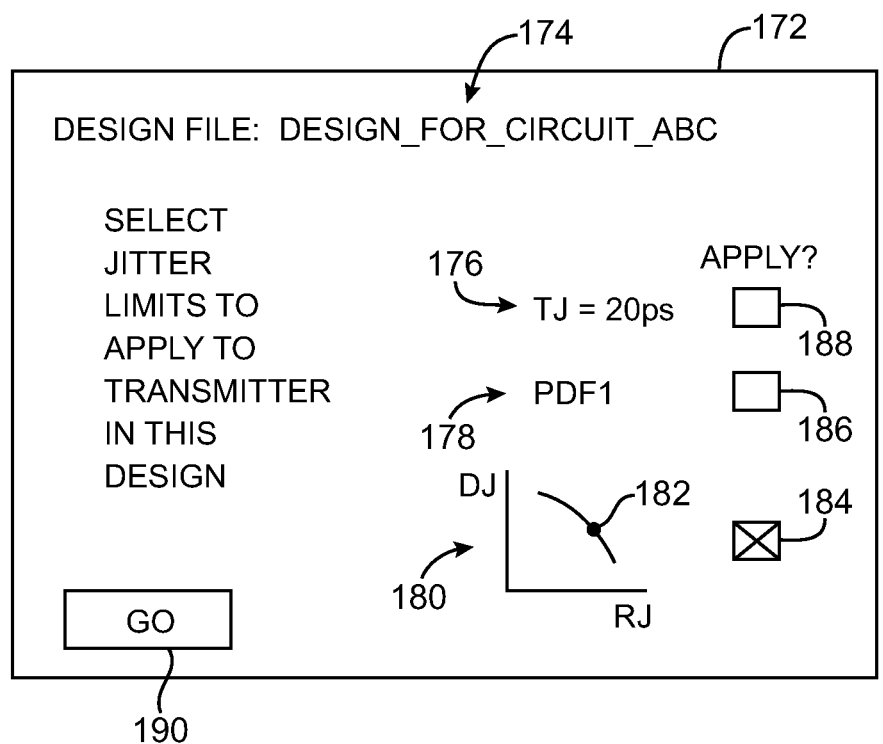
FIG. 9 is an illustrative logic design system design constraints entry screen that may be presented to a user to allow the user to specify which of various design recommendations are to be used in implementing the user's custom logic design in a programmable logic device in accordance with an embodiment of the present invention.

When the programmable logic device design tools are launched, the user may be presented with a constraint entry screen such as constraint entry screen 172 of FIG. 9. Region 174 may contain information on the currently selected design file being used by the logic design system. This design file may contain a description of the user's desired custom logic design (e.g., in a hardware description language such as VHDL). Screen 172 may contain options that let the user specify how the recommendations provided at the output of link analysis engine 130 are to be used as constraints in implementing the user's custom logic design.

In the illustrative example of FIG. 9, the first option relates to total jitter (TJ). As shown in region 176, link analysis engine 130 in this example has presented a recommended total jitter limit of 20 ps. If the user desires to use this recommended jitter limit as a design constraint for system 56, the user can click on option 188. As shown in region 178, the link analysis engine 130 has also generated a probability distribution function file PDF1, corresponding to graph 156 of FIG. 8. The user can direct the CAD tools to use this probability distribution function to impose jitter limits on the transmitter link subsystem by selecting option 186.

Some of the recommendations produced by analysis tools 126 may be presented in the form of tradeoffs. In the FIG. 9 example, a tradeoff graph 180 has been included in screen 172. The tradeoff graph 180 presents various possible deterministic jitter and random jitter values that will still satisfy a recommended total jitter limit. Any suitable user interface arrangement may be used to allow the user to select which of the various possible combinations of deterministic jitter and random jitter should be used as jitter limits when implementing the user's custom logic design.

With one suitable arrangement, graph 180 may be an interactive graph that contains clickable points on the tradeoff curve. The user can select a desired combination by clicking on a desired point. In the FIG. 9 example, the user has clicked on point 182 and has selected corresponding option box 184, thereby imposing the deterministic jitter and random jitter values associated with point 182 as constraints. When the user has finished providing the computer-aided design tools with link and subsystem constraints and other suitable design constraints, the user may click on go option 190 to initiate the design process. Logic design system 56 may then proceed to process the user's design. During processing, design system 56 may implement the custom logic circuitry of design file 174 while satisfying design constraints such as the jitter constraints that were produced by link analysis engine 130 and that were selected by the user on screen 172.

During the design process, the recommended link subsystem design constraints that are generated by link analysis engine 130 may be used to filter out inappropriate design choices. As an example, consider the situation in FIG. 10. As shown in FIG. 10, design system 120 may be provided with information (e.g., measured performance data) on numerous available integrated circuits that contain transmitter circuitry and that can therefore be used in implementing a transmitter in link 116. When the link analysis is performed by engine 130, engine 130 may produce a recommended jitter limit of 25 ps for the transmitter (as an example). In this situation, only some transmitter types will still be appropriate for use as transmitters.

In the FIG. 10 example, only transmitter types 1 and 2 in the table of FIG. 10 will be able to satisfy the 25 ps jitter limit. Accordingly, the user's choice of which transmitter type to use may be automatically restricted by system 120 to designs that contain transmitters of types 1 and 2. This type of filtering operation may be performed using any suitable arrangement. for example, when a user is using logic design system 56 to implement a given user design, logic design system 56 may automatically recommend to the user that the user choose between a first programmable logic device family that contains transmitters of type 1 and a second programmable logic device family that contains transmitters of type 2 (e.g., using interactive screens of options). Once the user has selected between these two programmable logic device families, system 56 may process the user's customer design file to implement the user's desired custom logic design in the resources available in the selected programmable logic design family.

Figure 11:
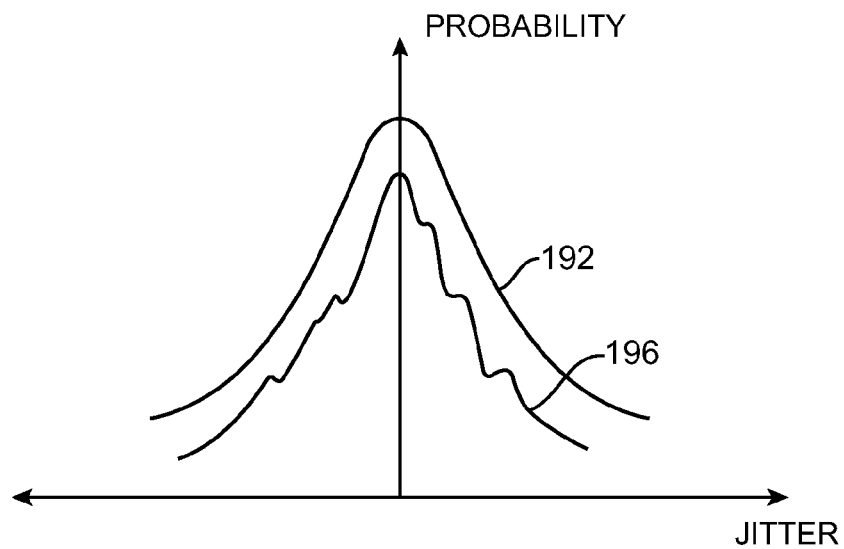
FIGS. 11 and 12 are diagrams showing how a design system may compare known measured signal impairment probability distribution functions such as measured jitter probability distribution functions for a particular type of link subsystem to a recommended design limit for that signal impairment that is represented by a recommended minimum probability distribution function for that signal impairment in accordance with an embodiment of the present invention.
Figure 12:
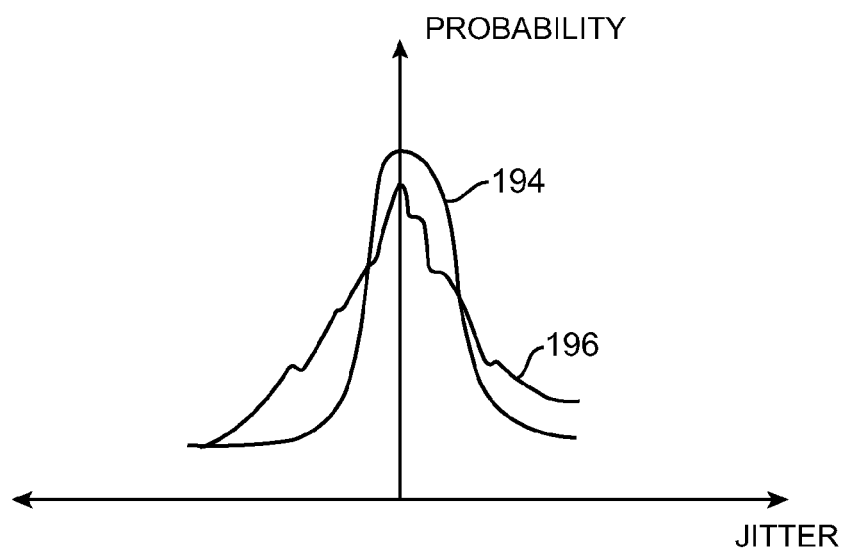

In the FIG. 10 example, filtering during the design process was implemented by applying a recommended maximum jitter limit to a database of available programmable logic device families. This is merely illustrative. For example, other types of signal impairment characteristics (e.g., noise limits) may be used as design constraints. Moreover, different representations may be used. FIGS. 11 and 12 provide an example in which link analysis engine 130 has computed a recommended maximum jitter probability distribution function for a given link subsystem (e.g., a transmitter) based on two different user-supplied characteristics for another subsystem (e.g., a receiver). The recommended maximum jitter for the link subsystem is represented by solid lines 192 and 194. In the FIG. 11 example, the user has used an input region such as region 146 of FIG. 7 to specify that a PLL M counter value of 20 should be used, whereas in the FIG. 12 example, a PLL M counter value of 10 was indicated to be applicable. As a result, the shapes of curves 192 and 194 are different.

Design system 120 may compare a set of stored probability distribution functions for various link subsystems (e.g., transmitters) and can retrieve and compare this data to the desired limits represented by curves 192 and 194 to determine whether a given link subsystem meets the requirements imposed by the curves. The link subsystem performance data that is retrieved may be measured data. In the FIG. 11 example, the probability distribution function 196 associated with a given transmitter has been retrieved and compared to curve 192. Because the jitter data for curve 196 is less than for curve 192, this transmitter would satisfy design requirements and can be satisfactorily used in designing link 116. Design system may notify the user of the system accordingly (e.g., by displaying this transmitter in a list of available devices that the user can use in the system, by informing logic design system 56 that a programmable logic device family that contains this transmitter is available for use in implementing the user's custom logic design, etc.). In the FIG. 12 example, the retrieved link subsystem jitter data 196 does not meet the requirements imposed by curve 194, so in this scenario the link subsystem would be filtered out from consideration by design system 120.

The technique of FIG. 10 in which stored link subsystem performance data is compared to one or more limit values produced by engine 130 and the technique of FIGS. 11 and 12 in which the recommended limits of engine 130 are compared to subsystem performance data in the form of probability distribution functions are merely illustrative. Link subsystems that will satisfy the operating constraints that are recommended by engine 130 may be identified using any suitable filtering techniques. As an example, the user may be provided with screens containing measured or modeled performance characteristics for various link subsystems and recommend performance characteristics from link analysis engine for visual comparison. The user may then select a desired link subsystem to be used in link 116 based on manual inspection and selection of appropriate associated on-screen options.

Design systems such as design system 120 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools and databases reside within the system. During operation, executable software such as the software of the computer aided design tools runs on the processor(s) of the system. Databases are used to store data for the operation of the system. In general, software and data may be stored on any computer-readable medium (storage) in design system 120. Such storage may include computer memory chips, removable and fixed media such as hard disk drives, flash memory, compact discs (CDs), DVDs, other optical media, and floppy diskettes, tapes, or any other suitable memory or storage device(s). When the software of design system 120 is installed, the storage of the system has instructions and data that cause the computing equipment in the system to execute various methods (processes). When performing these processes, the computing equipment is configured to implement the functions of the design system such as receiving input, performing analysis, producing output, using the output to implement a user's logic design, etc.

The computer aided design (CAD) tools of system 120, some or all of which are sometimes referred to collectively as a CAD tool, may be provided by a single vendor or multiple vendors. These tools may be provided as one or more suites of tools (e.g., a suite for performing tasks associated with analyzing communications links and implementing resulting designs in a programmable logic device) and/or as one or more separate software components (tools). Database(s) in the system may include one or more databases that are accessed only by a particular tool or tools and may include one or more shared databases. Shared databases may be accessed by multiple tools. For example, a first tool may store data for a second tool in a shared database. The second tool can access the shared database to retrieve the data stored by the first tool. This allows one tool to pass information to another tool. Tools may also pass information between each other without storing information in a shared database if desired.

Figure 13:
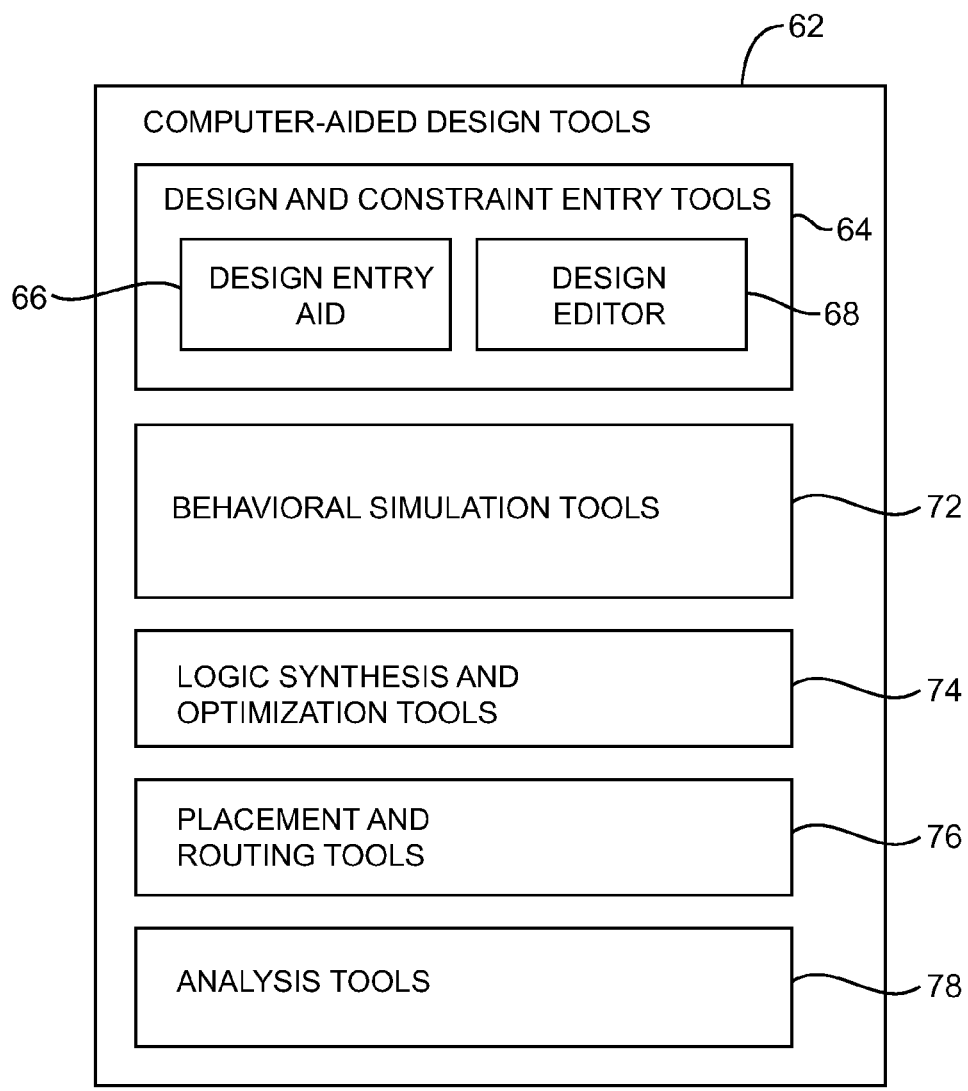
FIG. 13 is a diagram of illustrative computer-aided design (CAD) tools that may be used in a logic design system that receives recommended performance limits from a link analysis engine in accordance with an embodiment of the present invention.

Illustrative computer aided design tools 62 that may be used in a logic design system such as system 56 of FIG. 5 are shown in FIG. 13.

The design process involves the formulation of logic circuit functional specifications. A logic designer can specify how a desired circuit should function using design and constraint entry tools 64. Design and constraint entry tools 64 may include tools such as design and constraint entry aid 66 and design editor 68. Design and constraint entry aids such as aid 66 may be used to help a logic designer locate a desired design from a library of existing logic designs and may provide computer-aided assistance to the logic designer for entering (specifying) the desired design. As an example, design and constraint entry aid 66 may be used to present screens of options for a user. The user may click on on-screen options to select whether the circuit being designed should have certain features. Design editor 68 may be used to enter a design (e.g., by entering lines of hardware description language code), may be used to edit a design obtained from a library (e.g., using a design and constraint entry aid), or may assist a user in selecting and editing appropriate prepackaged code/designs. The jitter limits and other link subsystem performance recommendations that are produced by link analysis engine 130 in tools 126 may be stored in database 132 and retrieved by the user using design and constraint entry tools 64.

Design and constraint entry tools 64 may be used to allow a logic designer to provide a desired logic design using any suitable format. For example, design and constraint entry tools 64 may include tools that allow the logic designer to enter a logic design using truth tables. Truth tables can be specified using text files or timing diagrams and may be imported from a library. Truth table logic design and constraint entry may be used for a portion of a large circuit or for an entire circuit.

As another example, design and constraint entry tools 64 may include a schematic capture tool. A schematic capture tool may allow the logic designer to visually construct logic circuits from constituent parts such as logic gates and groups of logic gates. Libraries of preexisting logic circuits may be used to allow a desired portion of a design to be imported with the schematic capture tools.

If desired, design and constraint entry tools 64 may allow the logic designer to provide a logic design to the logic design system 10 using a hardware description language such as Verilog hardware description language (HDL) or Very High Speed Integrated Circuit Hardware Description Language (VHDL). The designer of the logic circuit can enter the logic design by writing hardware description language code with editor 68. Blocks of code may be imported from user-maintained or commercial libraries if desired.

After the design has been entered using design and constraint entry tools 64, behavioral simulation tools 72 may be used to simulate the functional performance of the design. If the functional performance of the design is incomplete or incorrect, the logic designer can make changes to the design using design and constraint entry tools 64. The functional operation of the new design can be verified using behavioral simulation tools 72 before synthesis operations have been performed using tools 74. Simulation tools such as tools 72 may also be used at other stages in the design flow if desired (e.g., after logic synthesis). The output of the behavioral simulation tools 72 may be provided to the logic designer in any suitable format (e.g., truth tables, timing diagrams, etc.).

Once the functional operation of the logic design has been determined to be satisfactory, logic synthesis and optimization tools 74 may be used to implement the logic design in a particular programmable logic device (i.e., in the logic and interconnect resources of a particular programmable logic device product or product family).

Tools 74 attempt to optimize the design by making appropriate selections of hardware to implement different logic functions in the logic design based on the logic design data and constraint data entered by the logic designer using tools 64.

After logic synthesis and optimization using tools 74, the logic design system may use tools such as placement and routing tools 76 to perform physical design steps (layout synthesis operations). Placement and routing tools 76 are used to determine how to place the circuits for each logic function within the programmable logic device. For example, if two counters interact with each other, the placement and routing tools 76 may locate these counters in adjacent logic regions on the programmable logic device to minimize interconnect delays. The placement and routing tools 76 create orderly and efficient implementations of logic designs for a given programmable logic device. Tools such as tools 74 and 76 may be part of a suite (e.g., part of a suite of compiler tools provided by a programmable logic device vendor). Tools such as tools 74 and 76 can take into account the link subsystem recommendations produced by analysis tools 126 while implementing a user's desired custom circuit design. This allows tools 74 and 76 to produce satisfactory link subsystem components while satisfying link performance constraints and link subsystem design constraints.

After an implementation of the desired logic design in the programmable logic device has been generated using placement and routing tools 76, the implementation of the design may be analyzed and tested using analysis tools 78. After satisfactory optimization operations have been completed using tools 62, tools 62 can produce the configuration data for the programmable logic device.

Figure 14:
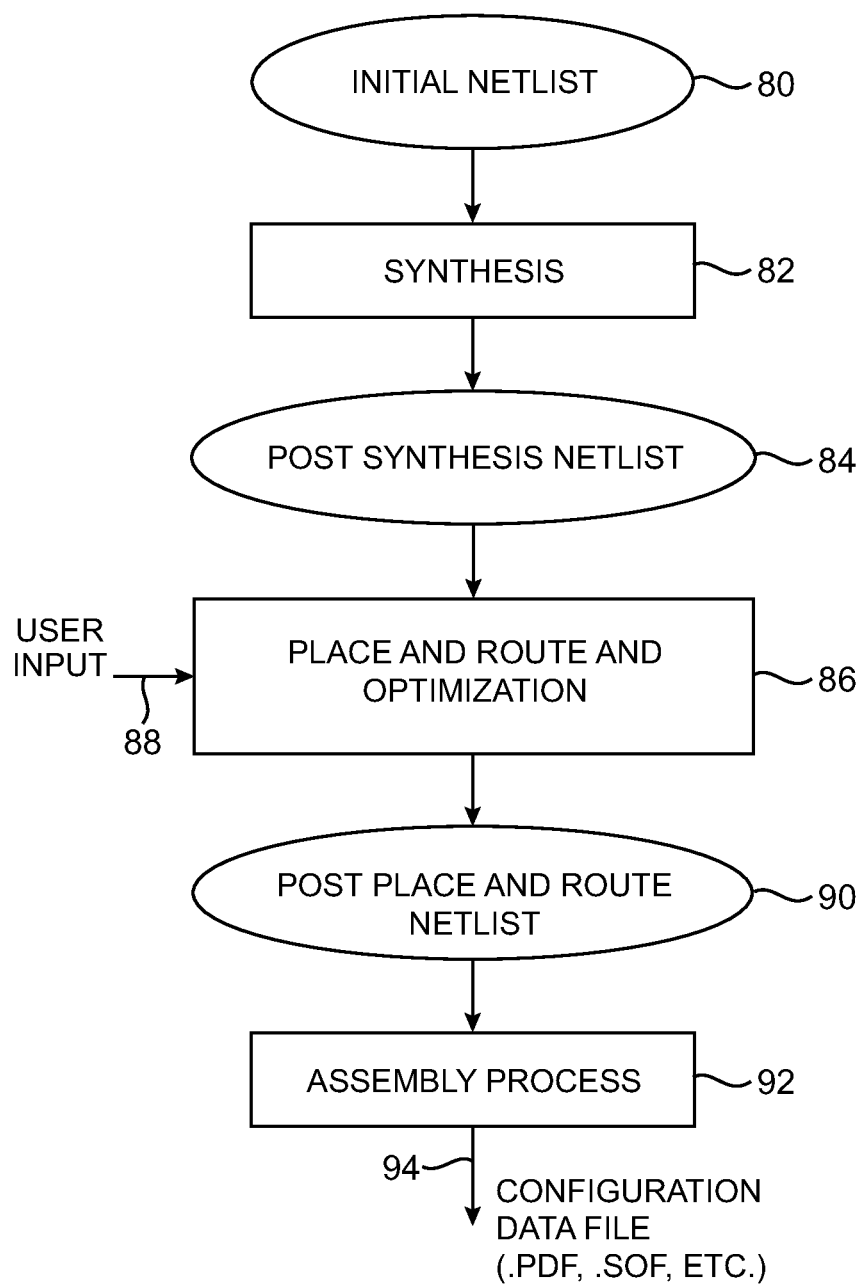
FIG. 14 is a flow chart of illustrative steps involved in using a logic design system of the type shown in FIG. 13 in designing a custom logic circuit and producing configuration data for that circuit in accordance with an embodiment of the present invention.

Illustrative operations involved in using tools 62 of FIG. 13 to produce configuration data files are shown in FIG. 14. As shown in FIG. 14, an initial netlist 80 may be synthesized at step 82 to produce a post-synthesis netlist 84. At step 86, user input 88 and the post synthesis netlist 84 may be processed during place and route and optimization operations. The resulting netlist 90 is processed further during an assembly process 92 to produce a configuration data file output 94 (e.g., a .pof or .sof file).

Figure 15:
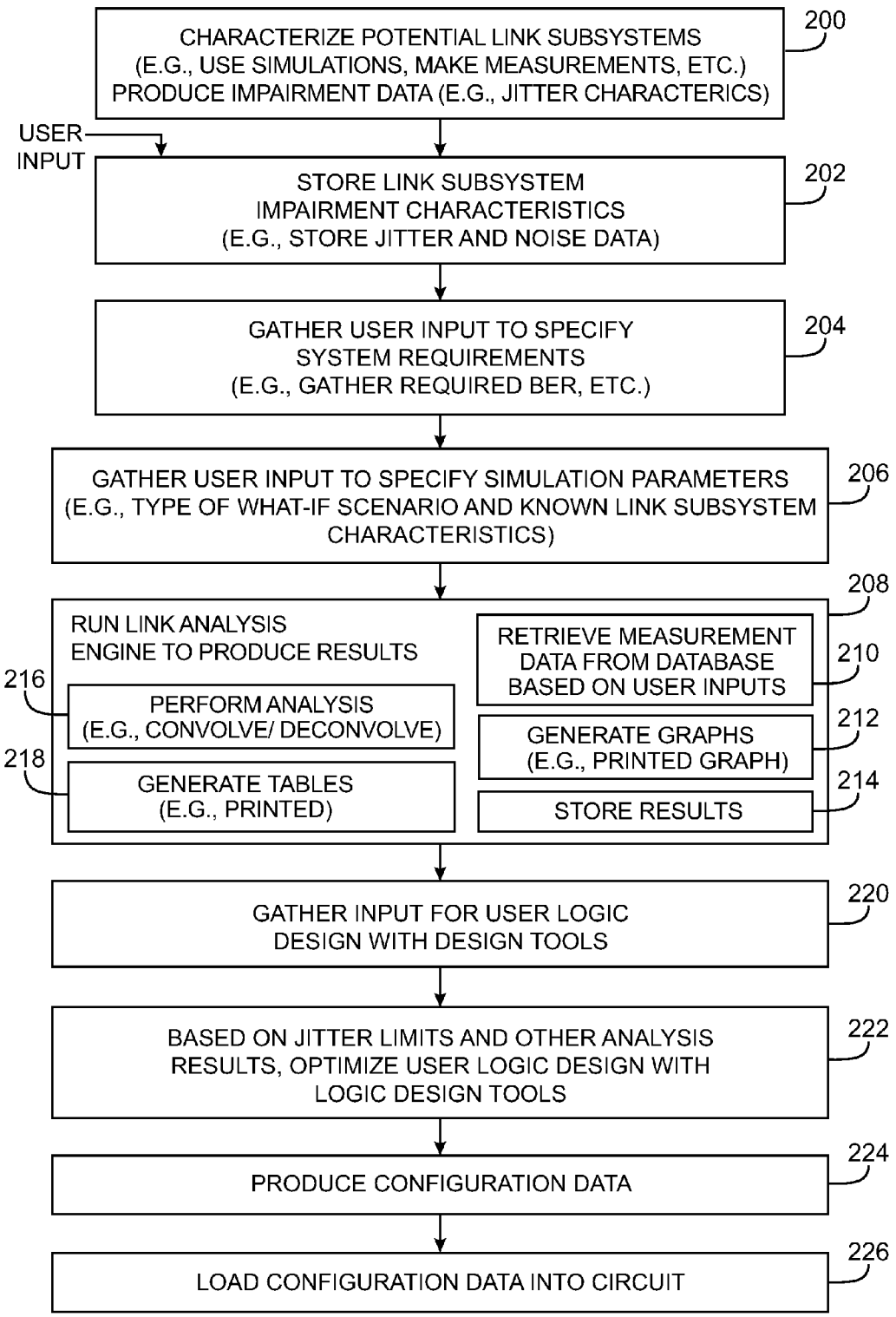
FIG. 15 is a flow chart of illustrative steps involved in using a design system to assist a user in designing a communications link and components that may be used in the communications link in accordance with an embodiment of the present invention.

Illustrative steps involved in using a design system to assist a user in designing circuits such as the circuits associated with link 116 of FIG. 1 are shown in FIG. 15. The operations of FIG. 15 may be performed using a design system such as design system 120 of FIG. 5 or any other suitable design system equipment.

At step 200, link subsystems may be characterized to make data on these link subsystems available to the design system. Transmitters such as transmitter 108 of FIG. 1, channels such as channel 110 of FIG. 1 and receivers such as receiver 112 of FIG. 1 may be characterized.

Link subsystems may be characterized using models, measurements, combinations of modeling results and measurements, etc. If desired, manual adjustments may be made (e.g., to lower an unexpectedly optimistic modeling result to a more conservative level). It may be advantageous to use models to characterize link subsystems when testing is not possible (e.g., because a link subsystem has not yet been manufactured and is therefore not available to be tested). An example of a model that may be used is the well-known SPICE (Simulation Program with Integrated Circuit Emphasis) circuit simulation program.

When available, performance data from device measurements may be preferred to circuit simulation results, because characterizations based on measured data tend to be more reflective of actual performance characteristics than model results. Any suitable measurements may be made on link subsystems. Examples of measurements include signal impairment characteristics such as noise and jitter. Measurements such as these may be made for a single circuit element (e.g., a single integrated circuit that contains a given type of transmitter) or for a family or other range of devices (e.g., a group of integrated circuits, each of which has a different transmitter design). Measurement data may also be gathered by making a series of characterizing measurements for a given link subsystem operated at different respective settings. As an example, a transmitter may be operated at different power supply voltages, gain settings, peak-to-peak output voltage settings, etc. These settings may be adjusted by static control signals provided from configuration bits (e.g., in a field-programmable gate array or other programmable circuit) or may be adjusted using other control signals (e.g., dynamic control signals from internal or external sources). Each different configuration of the transmitter may be tested. For example, a jitter probability distribution function measurement may be made for different possible power supply voltages, different possible gain settings, etc.

Characterizing measurements such as these may be made by personnel and equipment associated with the user's organization, personnel and equipment associated with the manufacturer associated with the link subsystem being tested, a third party service, or any other suitable entity. Measurements may be stored in one or more measurement data databases. The databases may be populated with raw data, data that has been downloaded from a manufacturer's website, data that has been reduced from a larger format (e.g., a full jitter probability distribution function) to a smaller format (e.g., a single peak-to-peak jitter or rms value). In addition to data on signal impairments (e.g., jitter characteristics, noise characteristics, etc.), measured data in the link subsystem characteristics database may include data on other operating characteristics (e.g., power consumption). Users may manually enter link subsystem characteristics (e.g., based on external knowledge of a link subsystem's performance, an independent measurement, model results, etc.).

At step 202, the user-supplied entries, model-generated output, and measured data on link subsystem performance may be stored by design system 120 in link characteristics database 128 of FIG. 5. Link characteristics database 128 may, as an example, be implemented as part of analysis tools 126.

At step 204, design system 120 and screens such as screen 138 of FIG. 7 may be used to gather user input on system requirements. As an example, a user may be interested in designing a system in which one or more transmitters 108 communicate with one or more receivers 112 over a channel such as channel 110 in link 116 of FIG. 1. Each link 116 in the system may have associated performance requirements. For example, if the user is designing a link to be compliant with a given communications standard, the standard may impose link performance requirements. Examples of link performance requirements include data rate (e.g. 2.5 Gbps), data format (e.g., a representative type of modulation pattern, etc.), and bit error rate (e.g., $10^{-12}$), or other suitable link requirements. The user may provide these requirements to design system 120 during step 204 using any suitable technique (e.g., direct entry from a keyboard, uploading data files of requirements, linking to a table or other data structure in an existing database, importing requirements from an associated computer-aided design tool, etc.). In the example of FIG. 7, screen 138 has a region 142 in which a user may enter known global link performance characteristics for link 116.

At step 206, design system 120 and screens such as screen 138 may be used to gather user input that specifies what type of what-if scenario is to be performed and that specifies known parameters. For example, the user may click on button 150 of screen 138 to choose from various what-if options and may enter known link subsystem characteristics in regions 144, 146, and 148.

The user may make the what-if scenario selection of step 206 explicitly or implicitly. As an example, the user may explicitly direct design system 120 to run a simulation in which minimum performance recommendations for a transmitter are produced based on known characteristics associated with a channel and a receiver (e.g., by selecting an option entitled "compute transmitter from known channel and receiver" from a drop-down menu or other suitable user interface). Implicit directions for design system 120 may arise, for example, when a user fills in data entry boxes such as those in channel region 148 and receiver data entry region 146 of FIG. 7 without making entries into transmitter region 144. When the user subsequently clicks on analyze option 152 of screen 138, design system 120 can conclude that a transmitter recommendation is desired.

In situations in which the user supplies sufficient information on known link subsystem characteristics, design system 120 may produce a unique set of recommended (required) characteristics for the uncharacterized link subsystem. When more detailed results are desired or when insufficient information is provided to generate a unique solution, solutions may be provided in the form of tradeoffs (e.g., multiple possible solutions in the form of tradeoff curves, etc.).

Link analysis operations may be performed during step 208. Analysis operations may be performed using link analysis engine 130 of analysis tools 126. At step 210, engine 130 may retrieve link subsystem measurement data based on the user-supplied input from step 206. For example, if a user specified during step 206 that link 116 should contain a receiver having a particular type (i.e., a type entered using the "RX Type" box in region 16 of Screen 138 in FIG. 7), then during step 210, link analysis engine 130 may retrieve characterizing data (e.g., a jitter probability distribution function) corresponding to a receiver of the specified type from link characteristics database 128.

At step 216, engine 130 can perform link analysis operations based on the measured link subsystem characteristics and other link subsystems characteristics. The operations of step 216 may be performed using numeric methods. Analytic solutions may also be used. In certain systems, a convolution-based approach may be used for performing link analysis operations. A convolution-based solution may be applicable, for example, in situations in which link subsystems can be assumed to be completely independent from one another. Modified solutions can be used when this type of assumption does not hold.

In a convolution-based solution, link analysis engine 130 can produce recommended link subsystem requirements by implementing and solving equation 1.

$$f_{sys}(t) = f_{TX}(t) * f_{CH}(t) * f_{RX}(t) \quad (1)$$

In equation 1, $f_{sys}(t)$ represents the system (link) probability distribution function, $f_{TX}(t)$ represents the transmitter probability distribution function, $f_{CH}(t)$ represents the channel probability distribution function, $f_{RX}(t)$ represent the receiver probability distribution function, and the "*" operator represents the convolution operation. The inverse of convolution is deconvolution, but both convolution and deconvolution approaches are sometimes referred to collectively as "convolution-based operations." The probability distribution functions in equation 1 may be obtained by retrieving appropriate measured probability distribution function data from database 128 based on the user's specified link subsystem characteristics (from step 206).

In solving equation 1, link analysis engine 130 can take into account link performance requirements obtained during step 204. In this way, link analysis engine 130 may produce recommended link subsystem performance requirements based on both link subsystem measurement data and link design criteria. Equation 2 may be used to interrelate link performance criteria such as bit error rate and $f_{sys}$.

$$\beta(t_s) = \rho[\int f_{sys}(t)dt + \int f_{sys}(t-UI)dt] \quad (2)$$

In equation 2, the first integration is performed over the interval $(t_s, \infty)$ and the second integration is performed over the interval $(-\infty, t_s)$. The term $\beta(t_s)$ represents the bit error rate of link 116 at sampling time $t_s$, $\rho$ represents the transition density function, $f_{sys}(t)$ represents the system probability distribution function, and UI represents a unit interval. Equation 2 allows engine 130 to obtain $f_{sys}$ from a user-specified bit-error rate (BER) (e.g., the bit error rate entered in region 142 of screen 138 in FIG. 7). The unknown link subsystem probability distribution function (e.g., the transmitter probability distribution function) may then be obtained from the known link subsystem probability distribution functions (e.g., for the channel and the receiver) using equation 1.

Consider, as an example, the use of engine 130 to compute a tradeoff curve of recommended deterministic jitter DJ and random jitter RJ at a transmitter 108 based on measured jitter characteristics for channel 110 and receiver 112. In this type of scenario, a quality factor $Q(\beta)$ may be computed based on the user-specified bit-error rate requirements of link 116 using equation 3.

$$Q(\beta) = (2)^{1/2} erfc^{-1}(2\beta) \quad (3)$$

In equation 3, $erfc^{-1}$ represents the inverse complementary error function and $\beta$ represents the bit error rate from region 142 of FIG. 7. Equation 4 may be used to interrelate transmitter jitter, receiver jitter, and channel jitter.

$$DJ_{TX} = UI - [(DJ_{CH} + DJ_{RX}) + 2Q(\beta)(\sigma_{TX}^2 + \sigma_{RX}^2)^{1/2}] \quad (4)$$

In equation 4, $DJ_{TX}$ represents the deterministic jitter of the transmitter, UI represents a unit interval (e.g., for a data rate for link 116 of 10 Gbps, UI=100 ps), $DJ_{CH}$ represents the deterministic jitter of the channel, $DJ_{RX}$ represents the deterministic jitter of the receiver, $Q(\beta)$ represents the quality factor from equation 3, $\sigma_{TX}$ represents the random jitter of the transmitter, and $\sigma_{RX}$ represents the random jitter of the receiver. Equation 4 may be solved for unknowns, based on known link subsystem values. For example, if the receiver and channel characteristics are known, equation 4 may be used to produce a graph or table of recommended values for transmitter deterministic jitter and transmitter random jitter (e.g., a graph such as graph 160 of FIG. 8). Discrete values may also be produced (e.g., as shown in region 158 of FIG. 8).

The data that is produced by link analysis engine 130 may be stored in a database such as database 132 (step 214), may be displayed on a monitor or printed as a graph using a printer in tools 126 (step 212), may be displayed on a monitor or printed as a table or list of recommended values using a printer in tools 126 (218), may be presented in audible from (e.g., using a speaker in tools 126), or may otherwise be presented to a user of design system 120.

A user may, if desired, launch a logic design tool such as logic design system 56 of FIG. 5. Although shown as being a separate design system in the FIG. 5 example, some or all of the functions of tools 126 and system 56 may, if desired, be implemented as part of the same software platform or suite of tools. Logic design system 56 may be launched using any suitable technique. For example, logic design system 56 may be launched when a user clicks on an option such as option 162 of FIG. 8 or may be launched automatically when the simulation activities of engine 130 are complete.

Once logic design system 56 has been launched, the logic design system may gather information on a desired custom logic design (step 220). For example, a user may provide logic design system 56 with a filename for a custom logic design (e.g., filename 174 of FIG. 9). The user may also enter and modify logic design constraints using other techniques (e.g., using tools 64 of FIG. 13). Logic design system 56 may gather information on the results produced by link analysis engine 130 from database 132.

At step 220, logic design system 56 may analyze the recommendations from the link analysis engine and information on the user's desired custom logic design to produce an optimized design that is compliant with the requirements of link 116. If, for example, the user's logic design involves a transmitter such as transmitter 108 that is to be implemented on a programmable circuit, system 56 may identify an implementation of the user's design in an appropriate programmable logic device in which the transmitter circuitry satisfies the transmitter requirements produced by link analysis engine 130. Configuration data corresponding to the design may be generated at step 224. At step 226, the configuration data may be loaded into a target device (e.g., a configuration device integrated circuit that loads the configuration data into an associated field-programmable gate array, a programmable integrated circuit such as a field-programmable gate array, etc.).

The foregoing is merely illustrative of the principles of this invention and various modifications can be made by those skilled in the art without departing from the scope and spirit of the invention.

What is claimed is:

1. A method of producing configuration data for a programmable integrated circuit that contains a transmitter, comprising:
   obtaining user input specifying an operating characteristic for a receiver that is to receive data from the transmitter in a communications link when the transmitter is used in a system;
   based on the user input, retrieving a receiver jitter probability distribution function; and
   generating configuration data for the programmable integrated circuit using the receiver jitter probability distribution function.

2. The method defined in claim 1 wherein generating the configuration data comprises:
   with a link analysis engine, producing recommended transmitter jitter limits that the transmitter needs to satisfy; and
   using the recommended transmitter jitter limits in generating the configuration data with a logic design system.

3. The method defined in claim 2 wherein producing the transmitter jitter limits comprises using the link analysis engine to perform convolution-based operations on at least the receiver jitter probability distribution function.

4. The method defined in claim 2 further comprising:
   with the logic design system, receiving data on a custom logic design for implementation in the programmable integrated circuit, wherein generating the configuration data comprises generating configuration data for the programmable logic device based on both the recommended transmitter jitter limits and the data on the custom logic design.

5. The method defined in claim 1, wherein generating the configuration data comprises:
   with a link analysis engine, producing recommended bit-error rate criteria that the communications link needs to satisfy.

6. The method defined in claim 1, wherein
retrieving the receiver jitter probability distribution function comprises retrieving a probability distribution function generated based on measured data.

7. A method of implementing a user-specified custom logic design on an integrated circuit using computer-aided-design (CAD) tools, the method comprising:
   characterizing link subsystems by measuring link subsystem performance characteristics for the link subsystems and storing the measured link subsystem performance characteristics in a database;
   obtaining user input for at least one link subsystem in a communications link;
   based on the user input, retrieving a corresponding probability distribution function of measured link subsystem performance characteristics from the database;
   based on the retrieved probability distribution function, generating configuration data implementing the user-specified custom logic design; and
   loading the configuration data into the integrated circuit to implement the user-specified custom logic design.

8. The method defined in claim 7 further comprising:
   with a link analysis engine, applying convolution-based operations to the retrieved probability distribution function of measured link subsystem performance characteristics to produce recommended link subsystem performance characteristics limits that another link subsystem in the communications link needs to satisfy.

9. The method defined in claim 8 further comprising:
   with the link analysis engine, obtaining a maximum bit-error rate for the communications link from the user.

10. The method defined in claim 9 wherein the link subsystem for which the user input is obtained comprises a receiver, wherein the link subsystem for which the recommended link subsystem performance characteristic limits are produced comprises a transmitter, wherein the communications link comprises a channel connected between the transmitter and the receiver, wherein the communications link to which the maximum bit-error rate corresponds includes the transmitter, the channel, and the receiver, wherein retrieving the corresponding probability distribution function of measured link subsystem performance characteristics from the database comprises retrieving a signal impairment probability distribution function corresponding to the receiver from the database, and wherein applying the convolution-based operations comprises producing recommended transmitter performance limits for the transmitter based on the maximum bit-error rate and the retrieved signal impairment probability distribution function.

11. The method defined in claim 10 wherein producing the recommended transmitter performance limits for the transmitter based on the maximum bit-error rate and the retrieved signal impairment probability distribution function comprises producing recommended transmitter jitter performance limits that the transmitter needs to satisfy.

12. The method defined in claim 10 wherein producing the recommended transmitter performance limits for the transmitter based on the maximum bit-error rate and the retrieved signal impairment probability distribution function comprises producing recommended transmitter jitter performance limits in the form of a table of deterministic jitter limit values that the transmitter needs to satisfy.

13. The method defined in claim 10 wherein producing the recommended transmitter performance limits for the transmitter based on the maximum bit-error rate and the retrieved signal impairment probability distribution function comprises producing recommended transmitter jitter performance limits in the form of a transmitter jitter probability distribution function that the transmitter needs to satisfy.

14. The method defined in claim 10 wherein producing the recommended transmitter performance limits for the transmitter based on the maximum bit-error rate and the retrieved signal impairment probability distribution function comprises producing recommended transmitter jitter performance limits in the form of a graph showing a transmitter deterministic jitter and transmitter random jitter tradeoff.

15. The method defined in claim 8, wherein the link subsystem for which the user input is obtained comprises a receiver, wherein the link subsystem for which the recommended link subsystem performance characteristic limits are produced comprises a transmitter, and wherein obtaining the user input comprises obtaining a receiver characteristic corresponding to a known performance characteristic of the receiver.

16. The method defined in claim 15, further comprising:
computing maximum jitter limits for the transmitter based on the retrieved measured link subsystem performance characteristics for the receiver.

17. A non-transitory computer readable storage medium for implementing a user-defined custom logic function on an integrated circuit, comprising instructions for:

receiving recommended link subsystem performance characteristics limits that were produced by a link analysis engine using convolution-based operations when analyzing a communications link containing link subsystems;
receiving circuit design data from a circuit designer for a custom logic design that contains at least one of the link subsystems; and
generating configuration data for loading into memory elements on a programmable integrated circuit to configure programmable logic on the programmable integrated circuit to implement the custom logic design while satisfying the recommended link subsystem performance characteristics limits.

18. The non-transitory computer-readable storage medium defined in claim 17, further comprising instructions for:
displaying an on-screen option that the circuit designer uses to enter a user-specified global performance characteristic for the communications link.

19. The non-transitory computer-readable storage medium defined in claim 18, wherein the instructions for displaying the on-screen option comprise instructions for displaying an option that presents the circuit designer with an opportunity to specify at least one of a target bit error rate and a target data rate for the communications link.

20. The non-transitory computer-readable storage medium defined in claim 17, further comprising instructions for:
displaying an on-screen option that presents the circuit designer with an opportunity to specify required performance characteristics for at least one of the link subsystems.

\* \* \* \* \*